United States Patent
Kwon et al.

(10) Patent No.: US 10,473,982 B2
(45) Date of Patent: *Nov. 12, 2019

(54) LIQUID CRYSTAL COMPOSITION AND A LIQUID CRYSTAL DISPLAY INCLUDING THE SAME

(71) Applicant: SAMSUNG DISPLAY CO., LTD., Yongin-si, Gyeonggi-Do (KR)

(72) Inventors: Sun Young Kwon, Yongin-si (KR); Tae Hoon Kim, Yongin-si (KR); Ji Hong Bae, Yongin-si (KR); Jong Ho Son, Yongin-si (KR); Keun Chan Oh, Yongin-si (KR); Gak Seok Lee, Yongin-si (KR); Chang Hun Lee, Yongin-si (KR); Ji Eun Jang, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/487,514

(22) Filed: Apr. 14, 2017

(65) Prior Publication Data

US 2018/0046032 A1  Feb. 15, 2018

(30) Foreign Application Priority Data

Aug. 11, 2016 (KR) .................. 10-2016-0102296

(51) Int. Cl.
| | | |
|---|---|---|
| G02F 1/1333 | (2006.01) | |
| G02F 1/1337 | (2006.01) | |
| C09K 19/30 | (2006.01) | |
| C09K 19/56 | (2006.01) | |
| C09K 19/06 | (2006.01) | |
| C09K 19/12 | (2006.01) | |

(52) U.S. Cl.
CPC ...... *G02F 1/133711* (2013.01); *C09K 19/062* (2013.01); *C09K 19/063* (2013.01); *C09K 19/3003* (2013.01); *C09K 19/3098* (2013.01); *C09K 19/56* (2013.01); *C09K 2019/122* (2013.01); *C09K 2019/301* (2013.01); *C09K 2019/3004* (2013.01); *C09K 2019/3009* (2013.01); *C09K 2019/3016* (2013.01); *C09K 2019/3021* (2013.01); *G02F 2001/133715* (2013.01); *G02F 2001/133742* (2013.01)

(58) Field of Classification Search
CPC .......... C09K 19/062; C09K 19/063; C09K 19/3003; C09K 19/3098; C09K 19/56; C09K 2019/122; C09K 2019/3004; C09K 2019/3009; C09K 2019/301; C09K 2019/3016; C09K 2019/3021; G02F 1/133711; G02F 2001/133715; G02F 2001/133742
USPC ....................................................... 252/299.6
See application file for complete search history.

(56) References Cited

U.S. PATENT DOCUMENTS

| | | | |
|---|---|---|---|
| 7,495,715 B2 * | 2/2009 | Um | ................... G02F 1/134363 349/38 |
| 7,757,280 B2 | 8/2010 | Klasen-Memmer et al. | |
| 7,785,675 B2 | 8/2010 | Irisawa et al. | |
| 9,303,208 B2 | 4/2016 | Yuan et al. | |
| 9,404,037 B2 | 8/2016 | Takeuchi et al. | |
| 2005/0224756 A1 | 10/2005 | Reiffenrath et al. | |
| 2016/0054602 A1 | 2/2016 | Tong et al. | |
| 2016/0326434 A1 * | 11/2016 | Ahn | ..................... G02F 1/1368 |
| 2018/0046032 A1 | 2/2018 | Kwon et al. | |

FOREIGN PATENT DOCUMENTS

| | | |
|---|---|---|
| CN | 103254912 | 8/2013 |
| CN | 104593004 | 5/2015 |
| JP | 5769894 | 8/2015 |
| KR | 1020080075789 | 8/2008 |
| KR | 101374694 | 3/2014 |
| KR | 10-2016-0024774 | 3/2016 |
| WO | 2004000771 | 12/2003 |

OTHER PUBLICATIONS

Shin-Tson Wu et al., "Optimal operation temperature of liquid crystal modulators", Appl. Opt. vol. 26 No. 16, pp. 3441-3445, 1987.
Office Action dated Nov. 6, 2018 in corresponding U.S. Appl. No. 15/610,789.
Office Action dated May 1, 2018 in corresponding U.S. Appl. No. 15/137,666.

* cited by examiner

*Primary Examiner* — Geraldina Visconti
(74) *Attorney, Agent, or Firm* — F. Chau & Associates, LLC

(57) ABSTRACT

A liquid crystal display including a first substrate, a second substrate disposed opposite the first substrate, and a liquid crystal layer disposed between the first substrate and the second substrate. The liquid crystal layer includes a liquid crystal composition. The liquid crystal composition includes at least one of liquid crystal compounds including a cyclopentadienyl group.

21 Claims, 5 Drawing Sheets

LIQUID CRYSTAL COMPOSITION AND A LIQUID CRYSTAL DISPLAY INCLUDING THE SAME

CROSS-REFERENCE TO RELATED APPLICATION

The present application claims priority under 35 U.S.C. § 119 to Korean Patent Application No. 10-2016-0102296, filed on Aug. 11, 2016 in the Korean Intellectual Property Office, the disclosure of which is incorporated by reference herein in its entirety.

TECHNICAL FIELD

Exemplary embodiments of the present invention relate to a liquid crystal composition, and more particularly to a liquid crystal display including the same.

DISCUSSION OF RELATED ART

A liquid crystal display may include a first substrate, a second substrate, and a liquid crystal layer. The first substrate may include a plurality of pixel electrodes. The second substrate may include a common electrode. The liquid crystal layer may be disposed between the first substrate and the second substrate. The liquid crystal display may display an image. The liquid crystal display may display an image by changing a light transmittance of the liquid crystal layer depending on an electrical field formed between each of the pixel electrodes and the common electrode. The liquid crystal display may include a plurality of pixels each including the pixel electrodes, respectively.

As liquid crystal displays are developed and may implement two-dimensional images and three-dimensional images, liquid crystal displays may have a configuration capable of providing a larger amount of image information to users. Accordingly, a liquid crystal display, which has a relatively higher reliability and a relatively fast driving speed may be desired.

SUMMARY

Exemplary embodiments of the present invention provide a liquid crystal composition, which has a relatively low rotational viscosity, and a liquid crystal display including the liquid crystal composition.

One or more exemplary embodiments of the present invention provide a display. The display includes a first substrate, a second substrate, and a liquid crystal layer. The second substrate is disposed opposite the first substrate. The liquid crystal layer is disposed between the first substrate and the second substrate. The liquid crystal layer includes a liquid crystal composition. The liquid crystal composition includes at least one of liquid crystal compounds.

The liquid crystal compounds are represented by Formulae 1 to 3:

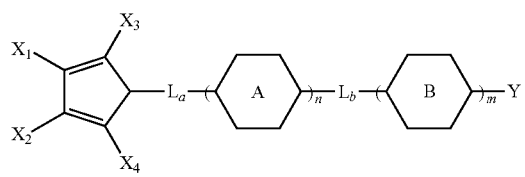

[Formula 1]

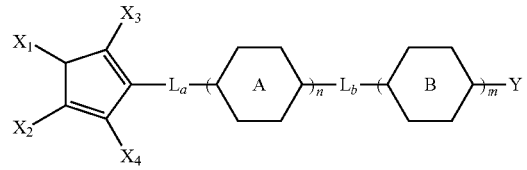

[Formula 2]

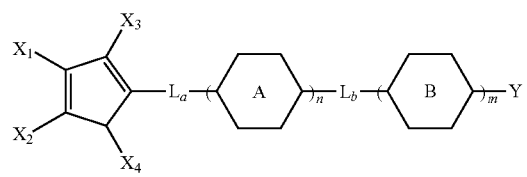

[Formula 3]

A and B are each independently 1,4-cyclohexylene or 1,4-phenylene. —H of A and B are each independently unsubstituted or substituted by —F, —OCF$_3$, —CF$_3$, —CHF$_2$, —CH$_2$F, an alkyl group or an alkoxy group of 1 or 2 carbon atoms.

Y is —H or an alkyl group of 1 to 10 carbon atoms. One or more —CH$_2$— groups are each independently unsubstituted or substituted by —CH=CH—, CF$_2$O—, —O—, —CO—O—, —O—CO—, or —O—CO—O— such that O atoms are not linked directly to one another. —H is unsubstituted or substituted by a halogen atom.

X$_1$ to X$_4$ are each independently —H, —F, —Cl, or an alkyl group of 1 or 2 carbon atoms.

n and m are each independently integers selected from 0 to 2.

L$_a$ and L$_b$ are each independently a single bond, —C≡C—, —COO—, —OCO—, —CF$_2$O—, —OCF$_2$—, —CH$_2$O—, —CO—, —O—, —(CH$_2$)$_2$—, or —CH=CH—.

The liquid crystal compounds of Formulae 1 to 3 may be in an amount of more than about 0% by weight to about 50% by weight with respect to the liquid crystal composition.

The liquid crystal compound of Formula 1 may include at least one of liquid crystal compounds represented by the following Formula 1-1:

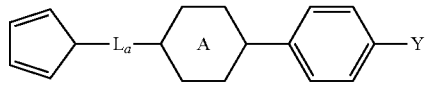

[Formula 1-1]

A, L$_a$, and Y may be the same as defined in Formula 1.

The liquid crystal compound of Formula 1-1 may include at least one of liquid crystal compounds represented by the following Formulae 1-1-1 to 1-1-3:

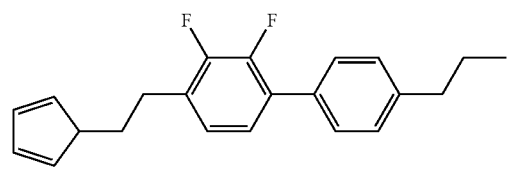

[Formula 1-1-1]

[Formula 1-1-2]

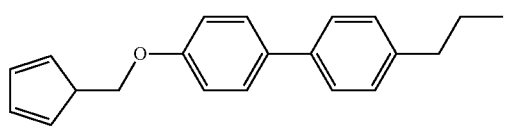 [SMILES: CCCc1ccc(-c2ccc(OCC3C=CC=C3)cc2)cc1]

[Formula 1-1-3]

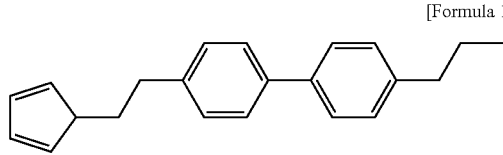

The liquid crystal composition includes at least one of liquid crystal compounds represented by the following Formula 4:

[Formula 4]

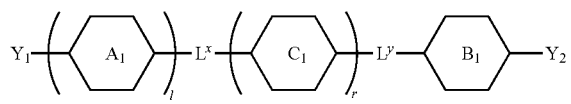

$Y_1$ and $Y_2$ may each independently be —F, —Cl, or an alkyl group of 1 to 15 carbon atoms. One or more —$CH_2$— groups may each be independently unsubstituted or substituted by —C≡C—, —CH=CH—, $CF_2O$—, —O—, —CO—O—, —O—CO—, or —O—CO—O— such that O atoms are not linked directly to each other. —H may be unsubstituted or substituted by a halogen atom.

$A_1$, $B_1$, and $C_1$ may each independently be 1,4-cyclohexylene or 1,4-phenylene. —H of $A_1$, $B_1$, and $C_1$ may each independently be unsubstituted or substituted by —F, —Cl, —$OCF_3$, —$CF_3$, —$CHF_2$, —$CH_2F$, an alkyl group or an alkoxy group of 1 or 2 carbon atoms.

l and r may each independently be an integer selected from 0 to 2.

$L^X$ and $L^Y$ may each independently be a single bond, —C≡C—, —COO—, —OCO—, —$CF_2O$—, —$OCF_2$—, —$CH_2O$—, —CO—, —O—, —$(CH_2)_2$—, or —CH=CH—.

The liquid crystal compound of Formula 4 may include at least one of liquid crystal compounds represented by the following Formulae 4-1 to 4-8:

[Formula 4-1]

[Formula 4-2]

[Formula 4-3]

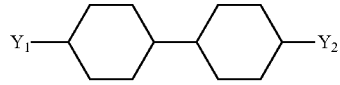

[Formula 4-4]

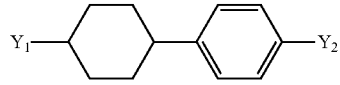

[Formula 4-5]

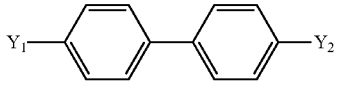

[Formula 4-6]

[Formula 4-7]

[Formula 4-8]

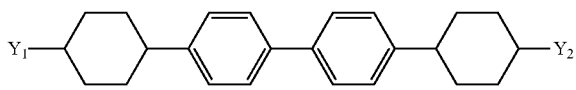

$Y_1$ and $Y_2$ may be the same as defined in Formula 4.

The liquid crystal compound of Formula 4 may include at least one of liquid crystal compounds represented by the following Formulae 4-9 to 4-19:

[Formula 4-9]

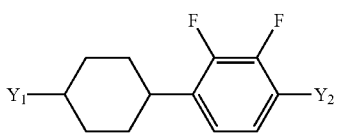

[Formula 4-10]

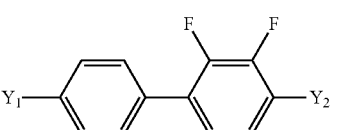

[Formula 4-11]

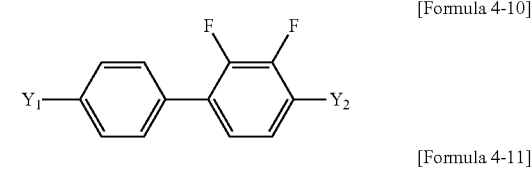

[Formula 4-12]

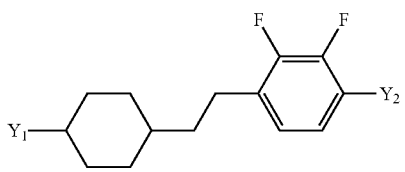

[Formula 4-13]

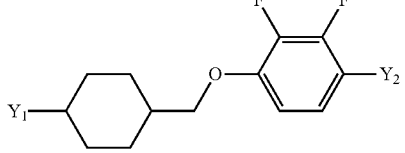

[Formula 4-14]

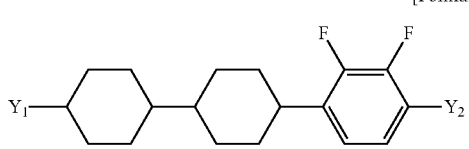

-continued

[Formula 4-15]

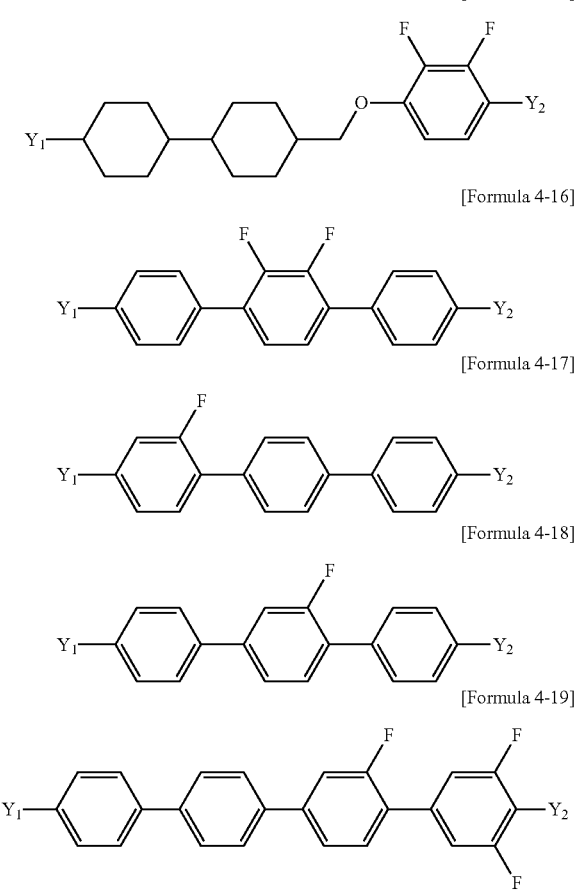

[Formula 4-16]

[Formula 4-17]

[Formula 4-18]

[Formula 4-19]

$Y_1$ and $Y_2$ may be the same as defined in Formula 4.

The liquid crystal composition may have a negative dielectric anisotropy.

The liquid crystal display may include an alignment layer. The alignment layer may be disposed between at least one of the first substrate and the liquid crystal layer and the second substrate and the liquid crystal layer. The alignment layer may include a polymer polymerized by a monomer represented by the following Formula 5:

[Formula 5]

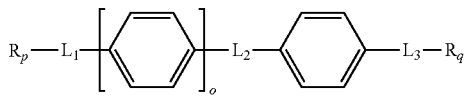

$R_p$ and $R_q$ are each independently an acrylate group, a methacrylate group, an epoxy group, an oxetane group, a vinyl-ether group, or a styrene group of 1 to 12 carbon atoms.

$L_1$ to $L_3$ are each independently a single bond, an ether group, a carbonyl group, or a carboxyl group of 1 or 2 carbon atoms.

o is an integer selected from 1 or 2.

The liquid crystal layer may be driven in a vertical alignment mode.

One or more exemplary embodiments of the present invention provide a composition. The composition includes at least one of liquid crystal compounds represented by the following Formulae 1 to 3:

[Formula 1]

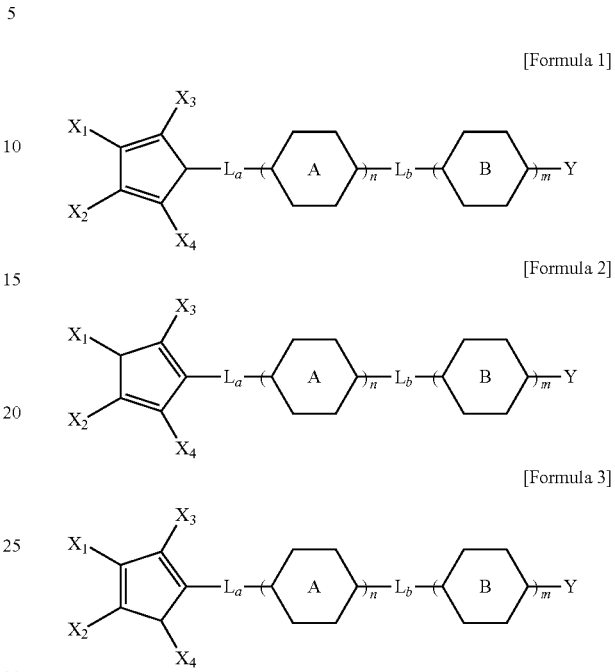

[Formula 2]

[Formula 3]

A and B are each independently 1,4-cyclohexylene or 1,4-phenylene.

—H of A and B are each independently unsubstituted or substituted by —F, —Cl, —OCF$_3$, —CF$_3$, —CHF$_2$, —CH$_2$F, an alkyl group or an alkoxy group of 1 or 2 carbon atoms.

Y is —H or an alkyl group of 1 to 10 carbon atoms. One or more —CH$_2$— groups may be each independently unsubstituted or substituted by —C≡C—, —CH=CH—, CF$_2$O—, —O—, —CO—O—, —O—CO—, or —O—CO—O— such that O atoms are not linked directly to one another. —H is unsubstituted or substituted by a halogen atom, $X_1$ to $X_4$ are each independently —H, —F, —Cl, or alkyl of 1 or 2 carbon atoms.

n and m are each independently an integer selected from 0 to 2.

$L_a$ and $L_b$ are each independently a single bond, —C≡C—, —COO—, —OCO—, —CF$_2$O—, —OCF$_2$—, —CH$_2$O—, —CO—, —O—, —(CH$_2$)$_2$—, or —CH=CH—.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION OF THE EMBODIMENTS

Figure 1:
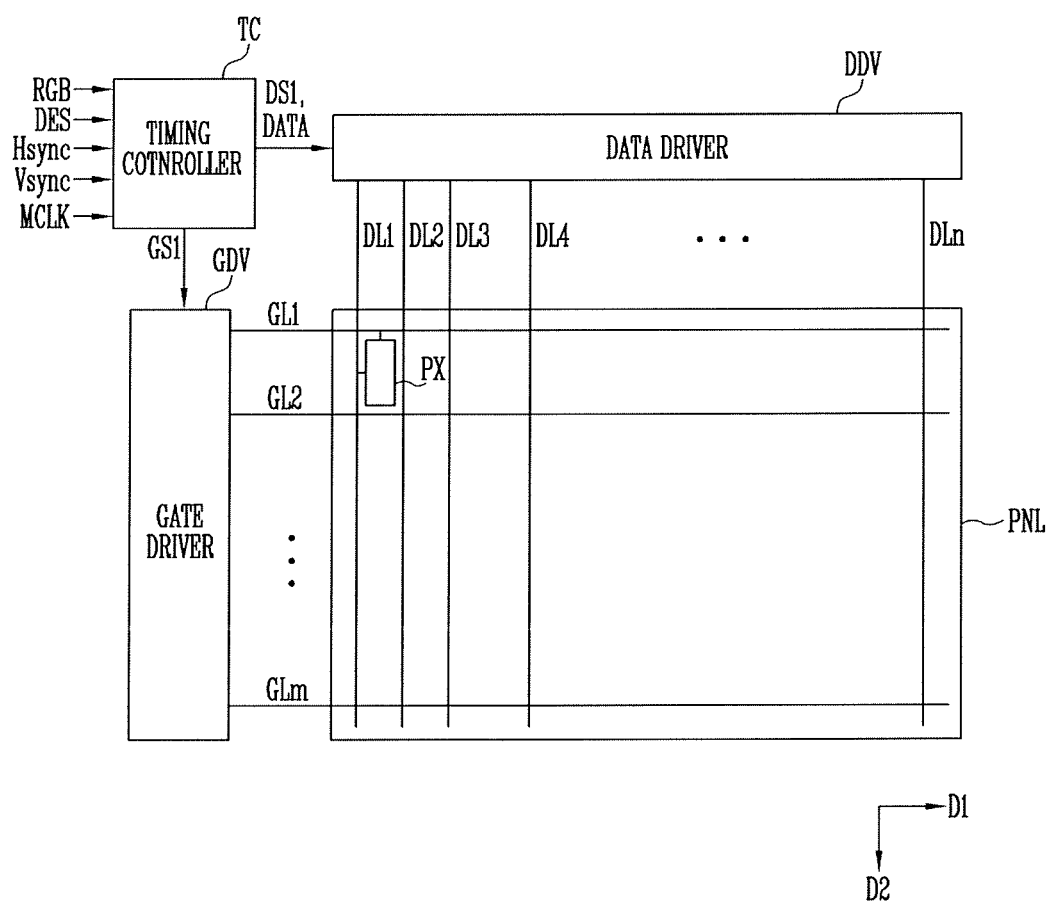
FIG. 1 is a schematic block diagram illustrating a liquid crystal display according to an exemplary embodiment of the present invention.

Exemplary embodiments of the present invention will be described below in more detail with reference to the accompanying drawings. In this regard, the exemplary embodiments may have different forms and should not be construed as being limited to the exemplary embodiments of the present invention described herein.

Like reference numerals may refer to like elements throughout the specification and drawings.

It will be understood that although the terms "first" and "second" may be used herein to describe various components, these components should not be limited by these terms.

Sizes of elements in the drawings may be exaggerated for clarity of description.

It will be understood that when a component, such as a layer, a film, a region, or a plate, is referred to as being "on" another component, the component can be directly on the other component or intervening components may be present.

One or more exemplary embodiments of the present invention relate to a liquid crystal composition. The liquid crystal composition may be used in a liquid crystal display. The liquid crystal composition may have a negative dielectric anisotropy.

A liquid crystal composition according to an exemplary embodiment of the present invention may include at least one of liquid crystal compounds having a cyclopentadienyl group. A liquid crystal compound having a cyclopentadienyl group may be represented by at least one of the following Formulae 1 to 3:

[Formula 1]
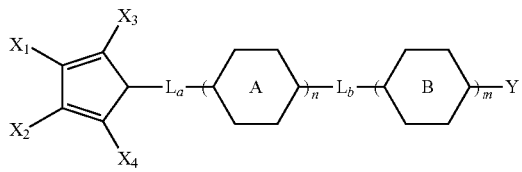

[Formula 2]
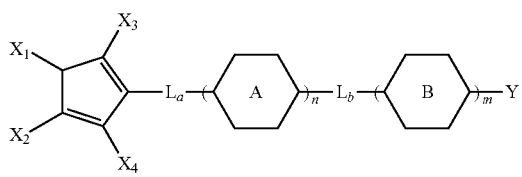

[Formula 3]
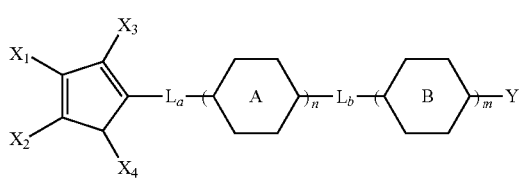

In Formulae 1 to 3:

A and B may each independently be 1,4-cyclohexylene or 1,4-phenylene;

—H of A and B may each independently be unsubstituted or substituted by —F, —Cl, —OCF$_3$, —CF$_3$, —CHF$_2$, —CH$_2$F, or an alkyl or an alkoxy of 1 or 2 carbon atoms; and Y may be —H or an alkyl of 1 to 10 carbon atoms. At least one —CH$_2$— groups may each independently be unsubstituted or substituted by —C≡C—, —CH=CH—, CF$_2$O—, —O—, —CO—O—, —O—CO—, or —O—CO—O—. Thus, O atoms might not be linked directly to each other. The hydrogen atom may be unsubstituted or substituted by a halogen atom.

n and m may each independently be an integer selected from 0 to 2;

X$_1$ to X$_4$ may each independently be —H, —F, or —Cl, or an alkyl of 1 or 2 carbon atoms; and L$_a$ and L$_b$ may each independently be a single bond, —C≡C—, —COO—, —OCO—, —CF$_2$O—, —OCF$_2$—, —CH$_2$O—, —CO—, —O—, —(CH$_2$)$_2$—, or —CH=CH—.

According to an exemplary embodiment of the present invention, the liquid crystal compound having the cyclopentadienyl group may be in an amount of more than about 0% by weight to about 50% by weight with respect to a total liquid crystal composition. Thus, the liquid crystal compounds represented by Formulae 1 to 3 may be in an amount of more than about 0% by weight to about 50% by weight with respect to the total liquid crystal composition. As an example, according to an exemplary embodiment of the present invention, the liquid crystal composition may include the liquid crystal compound represented by Formula 1 in an amount of more than about 0% by weight to about 50% by weight with respect to the total liquid crystal composition. Alternatively, the liquid crystal composition may include the liquid crystal compounds represented by Formulae 1 and 2 each in an amount of more than about 0% by weight to about 50% by weight with respect to the total liquid crystal composition.

When the liquid crystal compounds represented by Formulae 1 to 3 are omitted, an increase in the response speed of the liquid crystal display by the liquid crystal compounds of Formulae 1 to 3 might not occur. When an amount of the liquid crystal compounds represented by Formulae 1 to 3 exceeds about 50% by weight, it may be difficult to control the dielectric anisotropy, refractive anisotropy, or rotational viscosity of the total liquid crystal composition.

However, a composition ratio of the liquid crystal compounds represented by Formulae 1 to 3 is not limited to the above-described range. The liquid crystal compounds represented by Formulae 1 to 3 may have another composition ratio within a range in which the above-described effect may be obtained. According to an exemplary embodiment of the present invention, the liquid crystal compounds represented by Formulae 1 to 3 may be in an amount of more than about 0% by weight to about 30% by weight with respect to the total liquid crystal composition. According to an exemplary embodiment of the present invention, the liquid crystal compounds represented by Formulae 1 to 3 may be in an amount of more than about 10% by weight to about 25% by weight with respect to the total liquid crystal composition.

The liquid crystal compounds represented by Formulae 1 to 3 may have a substituted or unsubstituted cyclopentadienyl group. Thus, a relatively low rotational viscosity may be obtained. A double bond in the cyclopentadienyl group may be unsubstituted or substituted by a halogen group or an alkyl group. Thus, when the halogen group or the alkyl group is unsubstituted or substituted with the double bond in the cyclopentadienyl group, a steric hindrance effect may occur. Accordingly, a reaction of the double bond with another functional group having a relatively high reactivity may be suppressed.

According to an exemplary embodiment of the present invention, a decrease in the rotational viscosity of the liquid crystal compound may increase the response speed of the liquid crystal display when the liquid crystal display includes the liquid crystal compound according to an exemplary embodiment of the present invention. A rising time may represent the time for which liquid crystal molecules are changed by an electric field. A falling time Toff may represent the time for which the changed liquid crystal molecules are returned to the original state. The falling time and the rotational viscosity may satisfy the following Equation 1. In Equation 1, $\gamma_1$ may represent a rotational viscosity of the liquid crystal molecules; d may represent a distance between the first substrate and the second substrate, for example, a cell gap; and $K_{33}$ may represent a bending elastic modulus.

$$Toff \propto \frac{\gamma_1 d^2}{K_{33}} \qquad \text{[Equation 1]}$$

According to an exemplary embodiment of the present invention, the rotational viscosity of the liquid crystal compound may decrease. Accordingly, the falling time may decrease. Thus, the response speed of the liquid crystal display may increase.

According to an exemplary embodiment of the present invention, the liquid crystal compound represented by Formula 1 may include at least one of liquid crystal compounds represented by the following Formula 1-1. According to an exemplary embodiment of the present invention, the liquid crystal compounds represented by Formulae 2 and 3 may include various types of liquid crystal compounds.

According to an exemplary embodiment of the present invention, the liquid crystal compound represented by Formula 1 may include at least one of the liquid crystal compounds represented by the following Formula 1-1.

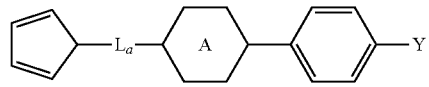

[Formula 1-1]

In Formula 1-1, A, $L_a$, and Y may be the same as defined in Formula 1.

According to an exemplary embodiment of the present invention, the liquid crystal compound represented by Formula 1-1 may include at least one of liquid crystal compounds represented by the following Formulae 1-1-1 to 1-1-3.

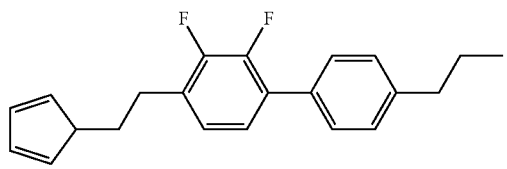

[Formula 1-1-1]

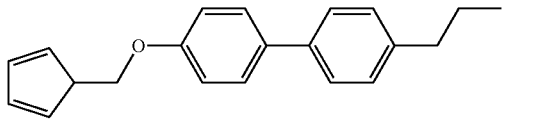

[Formula 1-1-2]

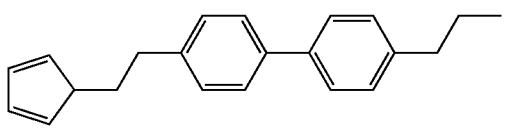 [SMILES: CCCc1ccc(-c2ccc(CCC3C=CC=C3)cc2)cc1]

[Formula 1-1-3]

The liquid crystal compounds represented by Formulae 1-1-1 to 1-1-3 may have a cyclopentadienyl group. Thus, a relatively low rotational viscosity and a relatively high refractive anisotropy may be maintained. The relatively low rotational viscosity may result from the double bond of the cyclopentadienyl group.

The liquid crystal composition may include other types of liquid crystal compounds. The liquid crystal composition may include other types of liquid crystal compounds in addition to the above-described liquid crystal compounds. The liquid crystal composition may include various additives. The various additives may be used in the art pertaining to the present disclosure. Liquid crystal compounds or additives except the liquid crystal compounds having the cyclopentadienyl group may be in an amount of not less than about 50% by weight to about 99.9% by weight with respect to the total liquid crystal composition. The composition ratio of the liquid crystal compounds and a composition ratio of the additives may be controlled, as desired.

The liquid crystal composition may include at least one of liquid crystal compounds represented by the following Formula 4.

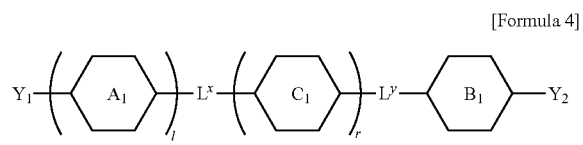

[Formula 4]

In Formula 4:

$Y_1$ and $Y_2$ may each independently be —F, —Cl, or an alkyl of 1 to 15 carbon atoms. At least one —CH$_2$— groups may be each independently unsubstituted or substituted by —C≡C—, —CH=CH—, CF$_2$O—, —O—, —CO—O—, —O—CO—, or —O—CO—O—. O atoms might not be linked directly to one another. —H may be unsubstituted or substituted by halogen atom, $A_1$, $B_1$, and $C_1$ may each independently be 1,4-cyclohexylene or 1,4-phenylene;

—H of $A_1$, $B_1$, and $C_1$ may each independently be unsubstituted or substituted by —F, —Cl, —OCF$_3$, —CF$_3$, —CHF$_2$, —CH$_2$F, or an alkyl or an alkoxy of 1 or 2 carbon atoms;

l and r may each independently be an integer selected from 0 to 2; and $L^X$ and $L^Y$ may each independently be a single bond, —C≡C—, —COO—, —OCO—, —CF$_2$O—, —OCF$_2$—, —CH$_2$O—, —CO—, —O—, —(CH$_2$)$_2$—, or —CH=CH—.

According to an exemplary embodiment of the present invention, the liquid crystal compound represented by Formula 4 may include at least one of liquid crystal compounds represented by the following Formulae 4-1 to 4-8.

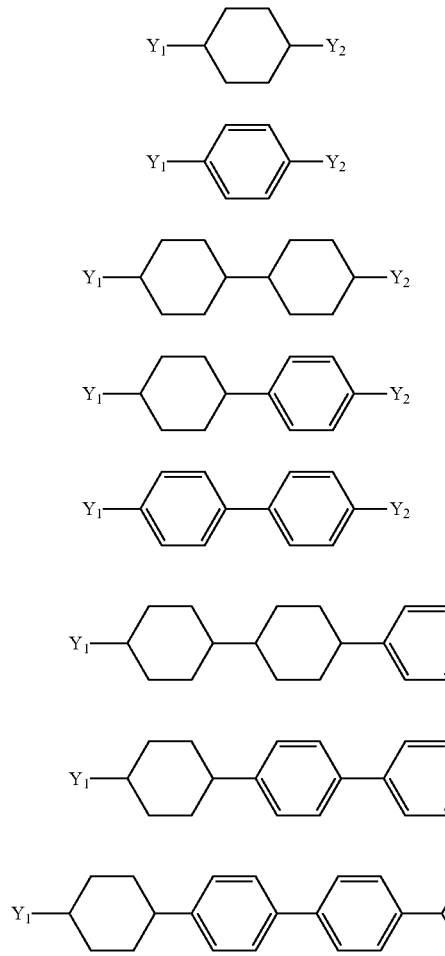

In Formulae 4-1 to 4-8, $Y_1$ and $Y_2$ may be the same as defined in Formula 4.

According to an exemplary embodiment of the present invention, the liquid crystal compound represented by Formula 4 may include at least one of liquid crystal compounds represented by the following Formulae 4-9 to 4-19.

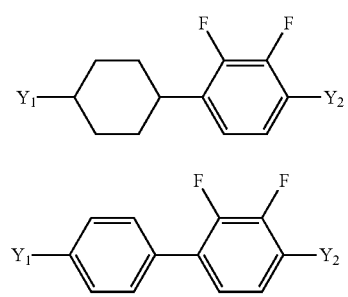

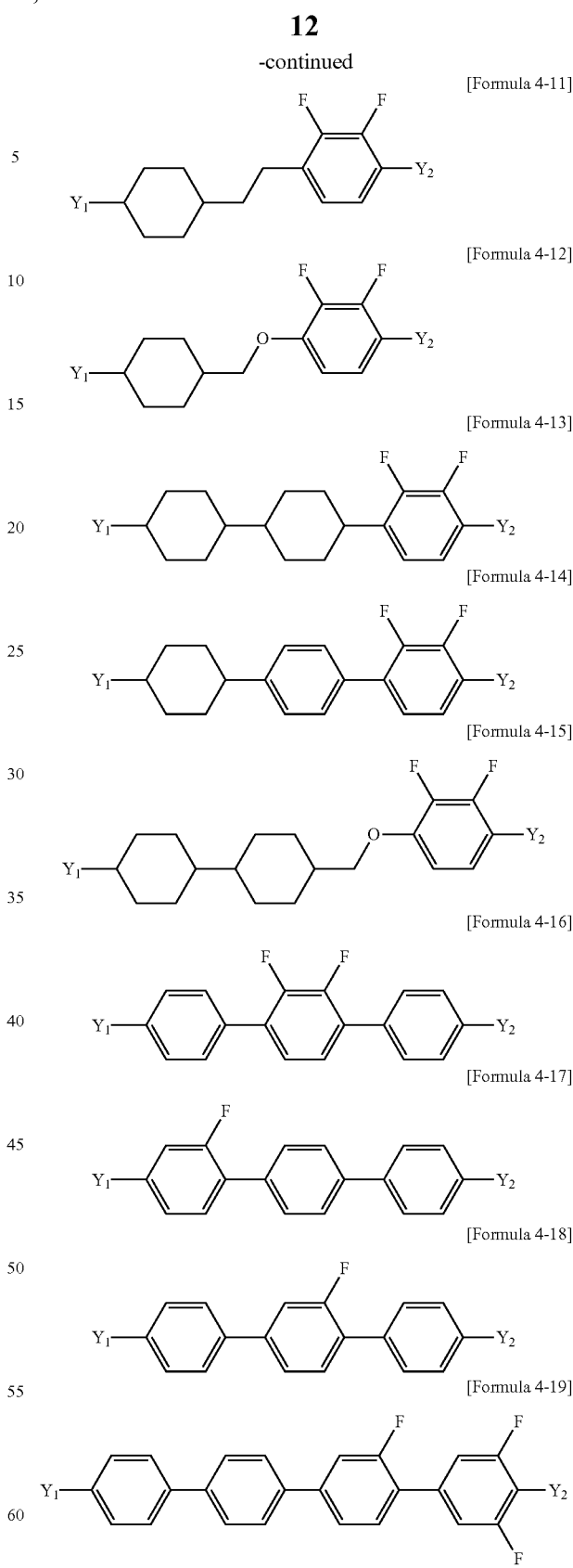

In Formulae 4-9 to 4-19, $Y_1$ and $Y_2$ may be the same as defined in Formula 4.

The liquid crystal composition may include at least one of the liquid crystal compounds represented by Formulae 4-1 to 4-8. Alternatively, the liquid crystal composition may include at least one of the liquid crystal compounds represented by Formulae 4-9 to 4-19. The liquid crystal composition may include at least one of the liquid crystal compounds represented by Formulae 4-1 to 4-8 and at least one of the liquid crystal compounds represented by Formulae 4-9 to 4-19.

The liquid crystal composition may have a negative dielectric anisotropy. Some of the liquid crystal compounds may have a positive dielectric anisotropy. However, the liquid crystal composition that is the total sum of the liquid crystal compounds may have a negative dielectric anisotropy.

The liquid crystal composition may include a monomer. The monomer may be polymerized to form an alignment layer. The monomer may be represented by Formula 5.

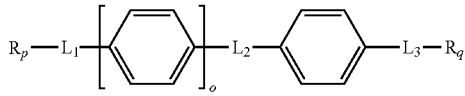

[Formula 5]

In Formula 5, $R_p$ and $R_q$ may each independently be a reactive group of 1 to 6 carbon atoms. The reactive group may cause a polymerization reaction. The reactive group may be an acrylate group, a methacrylate group, an epoxy group, an oxetane group, a vinyl-ether group, or a styrene group of 1 to 12 carbon atoms.

In Formula 5, $L_1$ to $L_3$ may each independently be a single bond, an ether, a carbonyl, or a carboxyl of 1 or 2 carbon atoms.

In Formula 5, o may be an integer selected from 1 or 2.

The liquid crystal composition according to an exemplary embodiment of the present invention may include various additives. Specifically, the liquid crystal composition may include an antioxidant. The liquid crystal composition may include a stabilizer. Various substances may be used as the stabilizer. For example, a hindered amine light stabilizer (HALS)-based stabilizer may be used as the stabilizer.

The liquid crystal composition according to an exemplary embodiment of the present invention may be included in liquid crystal displays. The liquid crystal composition may be included in liquid crystal displays of various modes, for example, a vertical alignment (VA) mode, a fringe field switching (FFS) mode, an in plane switching (IPS) mode, or a plane to light switching (PLS) mode. Particularly, the liquid crystal composition may exhibits a relatively high negative dielectric anisotropy and a relatively high refractive anisotropy under a relatively low rotational viscosity. Therefore, the liquid crystal composition may be included in liquid crystal displays of the VA mode. The VA mode may include a negative liquid crystal material. The negative liquid crystal material may include, for example, a multi-domain vertical alignment (MVA) mode, a patterned vertical alignment (PVA) mode, or a polymer stabilized vertical alignment (PS-VA) mode. The liquid crystal composition may have a relatively high refractive anisotropy while having a relatively low rotational viscosity. Thus, when the liquid crystal composition is included in a VA liquid crystal display, a high-quality image may be provided.

The liquid crystal composition may be included in a liquid crystal layer of a liquid crystal display.

FIG. 1 is a schematic block diagram illustrating a liquid crystal display according to an exemplary embodiment of the present invention.

Referring to FIG. 1, the liquid crystal display may include a display panel PNL, a timing controller TC, a gate driver GDV, and a data driver DDV.

The display panel PNL may be a liquid crystal panel. The liquid crystal panel may include a first substrate, a second substrate, and a liquid crystal layer. The liquid crystal layer may be disposed between the first substrate and the second substrate.

The display panel PNL may include a plurality of gate lines GL1, GL2, . . . , and GLm. The gate lines GL1 to GLm may extend in a first direction D1 (e.g., a row direction). The display panel PNL may include a plurality of data lines DL1, DL2, DL3, DL4, . . . , and DLn. The data lines DL1 to DLn may extend in a second direction D2 (e.g., a column direction). The second direction D2 may intersect the first direction D1. The display panel PNL may include a plurality of pixels PX. The pixels PX may be arranged in the first direction D1 and the second direction D2.

The timing controller TC may receive image data RGB from an external graphic controller. The timing controller TC may receive a control signal from the external graphic controller. The control signal may include a vertical synchronization signal Vsync. The vertical synchronization signal Vsync may be a frame distinction signal. The control signal may include a horizontal synchronization signal Hsync. The horizontal synchronization signal Hsync may be a row distinction signal. The control signal may include a data enable signal DES. The data enable signal DES may have a relatively high level for a section in which data is output to display an area into which the data enters. The control signal may include a main clock signal MCLK.

The timing controller TC may convert the image data RGB to be suitable for specifications of the data driver DDV. The timing controller TC may output the converted image data DATA to the data driver DDV. The timing controller TC may generate a gate control signal GS1. The timing controller TC may generate a data control signal DS1. The timing controller TC may generate the gate control signal GS1 and the data control signal DS1 based on the control signal. The timing controller TC may output the gate control signal GS1 to the gate driver GDV. The timing controller TC may output the data control signal DS1 to the data driver DDV. The gate control signal GS1 may be a signal for driving the date driver GDV. The data control signal DS1 may be a signal for driving the data driver DDV.

The gate driver GDV may generate a gate signal. The gate signal may be based on the gate control signal GS1. The gate driver GDV may output the gate signal to the gate lines GL1 to GLm. The gate control signal GS1 may include a scan start signal. The scan start signal may instruct scan start. The gate control signal GS1 may include at least one clock signal. The at least one clock signal may control the output period of a gate-on voltage. The gate control signal GS1 may include an output enable signal. The output enable signal may limit the maintenance time of, for example, a gate-on voltage.

The data driver DDV may generate a gray scale voltage. The gray scale voltage may correspond to the image data DATA. The gray scale voltage may correspond to the image data DATA based on the data control signal DS1. The data driver DDV may output the gray scale voltage to the data lines DL1 to DLn. The data driver DDV may output the gray scale voltage as a data voltage to the data lines DL1 to DLn. The data voltage may include a positive data voltage. The positive data voltage may have a positive value with respect to a common voltage. The data voltage may include a negative data voltage. The negative data voltage may have a negative value with respect to the common voltage. The data control signal DS1 may include a horizontal start signal. The horizontal start signal may inform the start of transmission of the image data DATA to the data driver DDV. The data control signal DS1 may include a load signal. The load signal may instruct the data driver DDV to apply the data voltage to the data lines DL1 to DLn. The data control signal DS1 may include an inversion signal. The inversion signal may invert the polarity of the data voltage with respect to the common voltage.

Each of the timing controller TC, the gate driver GDV, and the data driver DDV may be directly mounted in the form of at least one integrated circuit chip on the display panel PNL. Each of the timing controller TC, the gate driver GDV, and the data driver DDV may be mounted on a flexible printed circuit board. The flexible printed circuit board may be attached in the form of a tape carrier package (TCP) to the display panel PNL. Each of the timing controller TC, the gate driver GDV, and the data driver DDV may be mounted on a separate printed circuit board. Alternatively, at least one of the gate driver GDV or the data driver DDV may be integrated on the display panel PNL with the gate lines GL1 to GLm, the data lines DL1 to DLn, and transistors. The timing controller TC, the gate driver GDV, and the data driver DDV may be integrated as a single chip.

The liquid crystal display illustrated in FIG. 1 may be implemented in various forms and exemplary embodiments of the present invention are not limited thereto.

Figure 2:
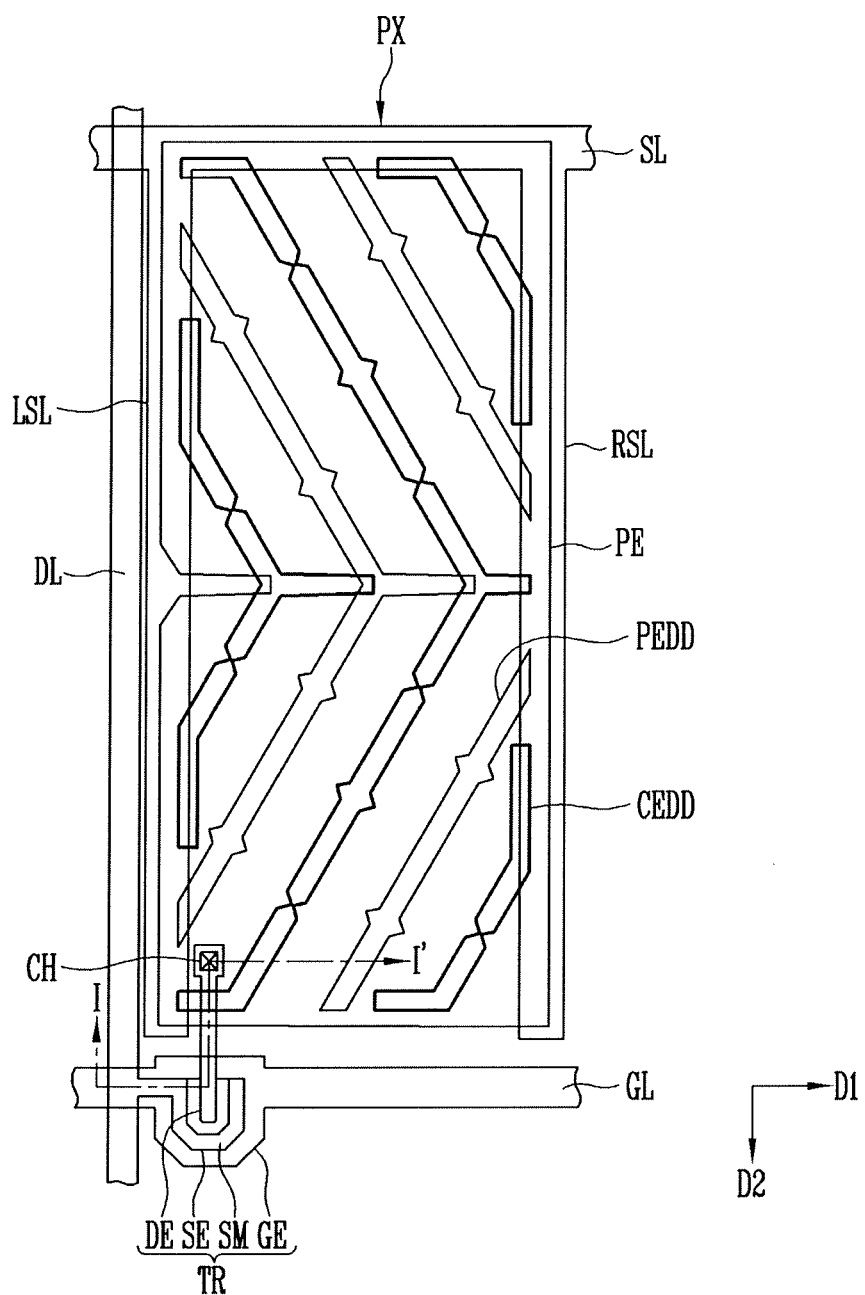
FIG. 2 is a plan view illustrating a liquid crystal display according to an exemplary embodiment of the present invention.
Figure 3:
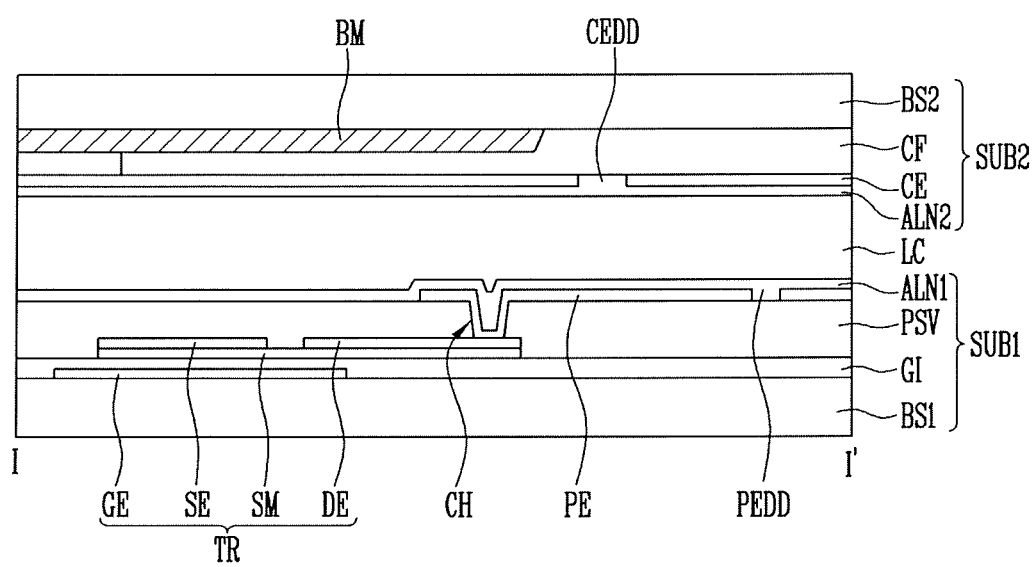
FIG. 3 is a sectional view taken along a line I-I' of FIG. 2 according to an exemplary embodiment of the present invention.
Figure 4:
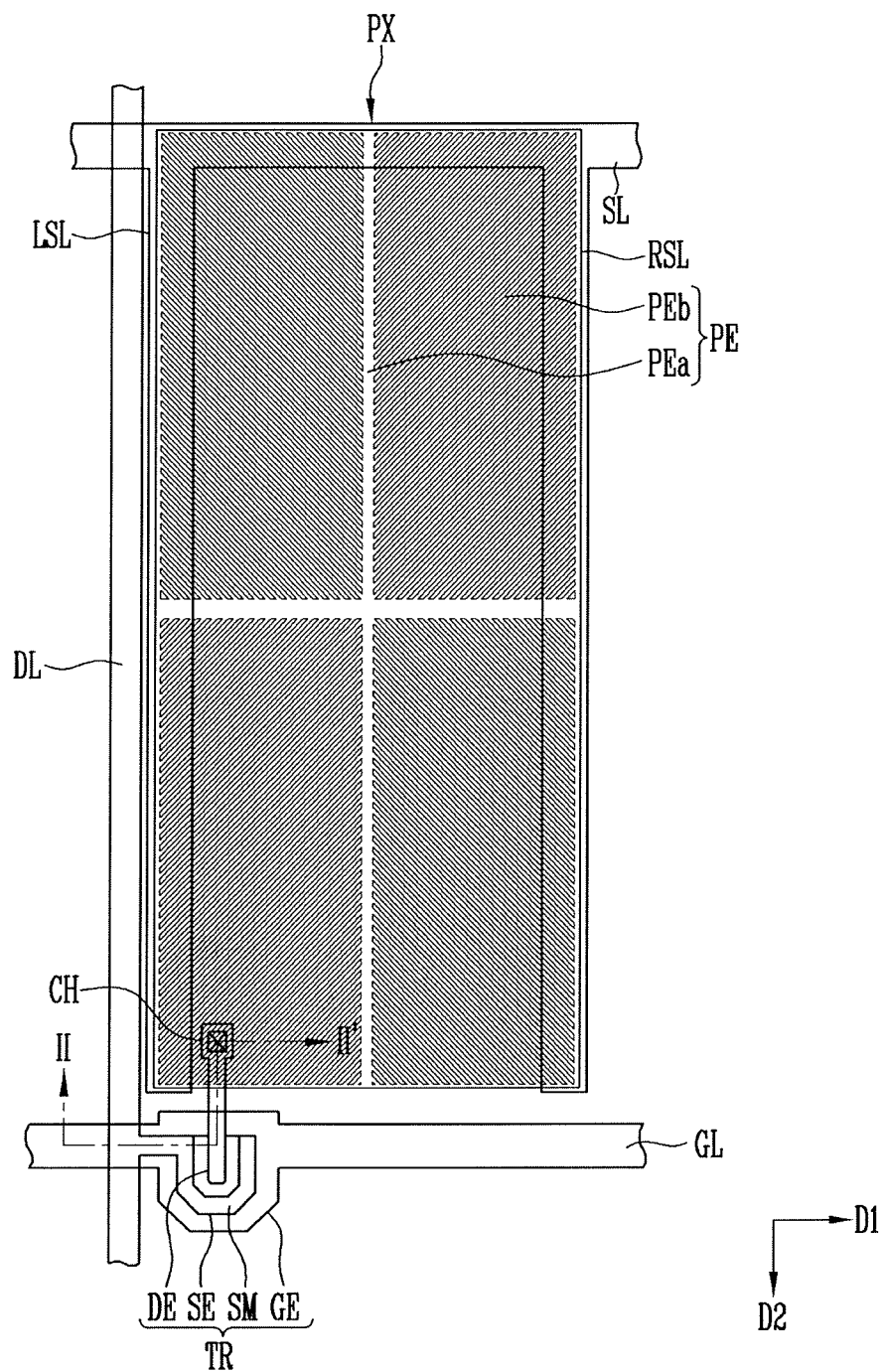
FIG. 4 is a plan view illustrating a liquid crystal display according to an exemplary embodiment of the present invention.
Figure 5:
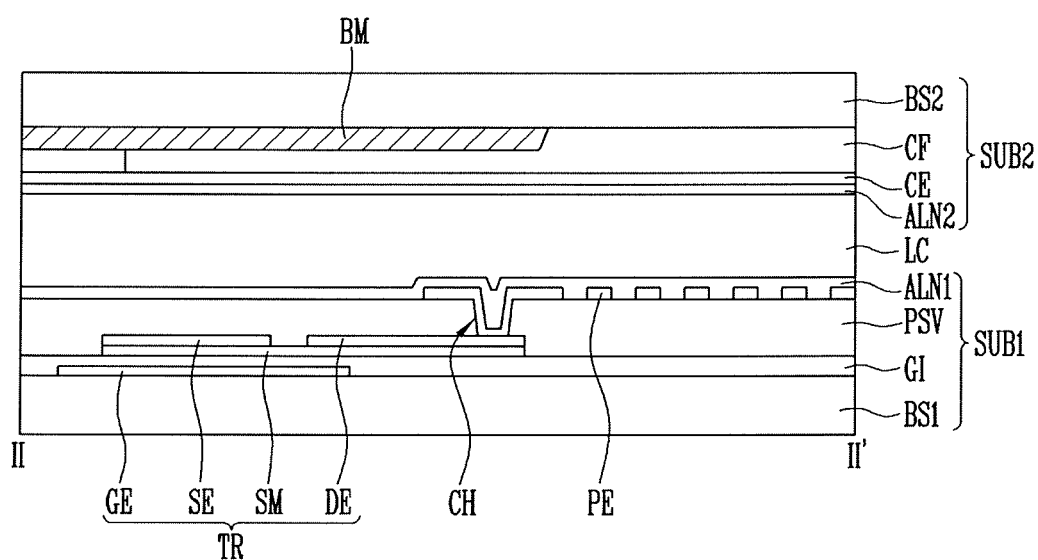
FIG. 5 is a sectional view taken along a line II-II' of FIG. 4 according to an exemplary embodiment of the present invention.

FIG. 2 is a plan view illustrating a liquid crystal display according to an exemplary embodiment of the present invention. FIG. 3 is a sectional view taken along a line I-I' of FIG. 2 according to an exemplary embodiment of the present invention. FIG. 4 is a plan view of a liquid crystal display according to an exemplary embodiment of the present invention. FIG. 5 is a sectional view taken along a line II-II' of FIG. 4 according to an exemplary embodiment of the present invention.

Referring to FIGS. 2 and 3, the liquid crystal display may include a first substrate SUB1, a second substrate SUB2, and a liquid crystal layer LC. The second substrate SUB2 may be disposed opposite the first substrate SUB1. For example, the second substrate SUB2 may be disposed above the first substrate SUB1. The liquid crystal layer may be disposed between the first substrate SUB1 and the second substrate SUB2.

The first substrate SUB1 may include a first base substrate BS1, a plurality of gate lines GL, a plurality of data lines DL, a plurality of pixels PX, and a first alignment layer ALN1.

The first substrate SUB1 may include a plurality of pixel regions. The pixel regions may be arranged in a matrix form. The pixels PX may be provided corresponding to the respective pixel regions. Each of the pixels PX may be connected to a corresponding data line among sequentially arranged data lines. Each of the pixels PX may be connected to a corresponding gate line among adjacent gate lines. According to an exemplary embodiment of the present invention, a gate line to which one pixel is connected may be referred to as a gate line GL. A data line to which one pixel is connected may be referred to as a data line DL.

The gate line GL may be formed on the first base substrate BS1. The gate line GL may extend in the first direction D1. The data line DL may be formed on the gate line GL. The data line DL may extend in the second direction D2. A gate insulating layer GI may be disposed between the data line DL and the gate line GL. The second direction D2 may intersect the first direction D1. The gate insulating layer GI may be disposed on a surface of the first base substrate BS1. For example, the gate insulating layer GI may be disposed on an upper surface of the first base substrate BS1. The gate insulating layer GI may cover the gate line GL.

Each of the pixels PX may be connected to a corresponding gate line GL among the gate lines. Each of the pixels PX may be connected to a corresponding data line DL among the data lines.

Each of the pixels PX may include a thin film transistor TR, a pixel electrode PE, and a storage electrode part. The pixel electrode PE may be connected to the thin film transistor TR.

The thin film transistor TR may include a gate electrode GE, a semiconductor pattern SM, a source electrode SE, and a drain electrode DE.

The gate electrode GE may protrude from the gate line GL. Alternatively, the gate electrode GE may be disposed on a region of the gate line GL. For example, the gate electrode GE may be disposed on a partial region of the gate line GL.

The gate electrode GE may include a metal. The gate electrode GE may include at least one of nickel, chrome, molybdenum, aluminum, titanium, copper, tungsten, or an alloy thereof. The gate electrode GE may have a single-layered structure. Alternatively, the gate electrode GE may have a multi-layered structure. The single-layered structure and the multi-layered structure may each include metal. For example, the gate electrode GE may have a triple-layered structure in which molybdenum, aluminum, and molybdenum are sequentially stacked. The gate electrode GE may have a double-layered structure in which titanium and copper are sequentially stacked. Alternatively, the gate electrode GE may be a single layer an alloy of titanium or copper.

The gate insulating layer GI may be disposed over the gate electrode GE.

The semiconductor pattern SM may be disposed on the gate insulating layer GI. The semiconductor pattern SM may be disposed on the gate electrode GE. The gate insulating layer GI may be disposed between the semiconductor pattern SM and the gate electrode GE. A region of the semiconductor pattern SM may overlap with the gate electrode GE. For example, a partial region of the semiconductor pattern SM may overlap with the gate electrode GE. The semiconductor pattern SM may include a doped or undoped silicon thin film. Alternatively, the semiconductor pattern SM may include a silicon thin film. The silicon thin film may be amorphous or crystalline. The semiconductor pattern SM may include a crystalline or amorphous oxide semiconductor thin film.

The source electrode SE may be branched from the data line DL. The source electrode SE may be disposed on an ohmic contact layer. A region of the source electrode SE may overlap with the gate electrode GE. For example, a partial region of the source electrode SE may overlap with the gate electrode GE.

The drain electrode DE may be spaced apart from the source electrode SE. The semiconductor pattern SM may be disposed between the drain electrode DE and the source electrode SE. The drain electrode DE may be disposed on the ohmic contact layer. A region of the drain electrode DE may overlap with the gate electrode GE. For example, a partial region of the drain electrode DE may overlap with the gate electrode GE.

The source electrode SE and the drain electrode DE may include at least one of nickel, chrome, molybdenum, aluminum, titanium, copper, tungsten, or an alloy thereof. The source electrode SE and the drain electrode DE may have a single-layered structure. Alternatively, the source electrode SE and the drain electrode DE may have a multi-layered structure. The single-layered structure and the multi-layered structure may each include metal. For example, each of the source electrode SE and the drain electrode DE may have a double-layered structure in which titanium and copper are sequentially stacked. Alternatively, each of the source electrode SE and the drain electrode DE may have a single-layered structure including an alloy including titanium and copper.

The source electrode SE and the drain electrode DE may be spaced apart from each other. Thus, an upper surface of the semiconductor pattern SM may be exposed. The upper surface of the semiconductor pattern SM may be exposed between the source electrode SE and the drain electrode DE. The semiconductor pattern SM disposed between the source electrode SE and the drain electrode DE may form a conductive channel. The conductive channel may be disposed between the source electrode SE and the drain electrode DE. The conductive channel may be formed based on whether a voltage is applied the gate electrode GE.

The storage electrode part may include a storage line SL. The storage line SL may extend in the first direction D1. The storage electrode part may include a first branch electrode LSL and a second branch electrode RSL. The first and second branch electrodes LSL and RSL may each branch from the storage line SL. The first and second branch electrodes LSL and RSL may each extend in the second direction D2.

The pixel electrode PE may be connected to the drain electrode DE. A protective layer PSV may be disposed between the pixel electrode PE and the drain electrode DE. The pixel electrode PE may overlap with the storage line SL. For example, the pixel electrode PE may partially overlap with the storage line SL. The pixel electrode PE may overlap with the first and second branch electrodes LSL and RSL. For example, the pixel electrode PE may partially overlap with the first and second branch electrodes LSL and RSL. The pixel electrode PE partially overlapping with each of the storage line SL and the first and second branch electrodes LSL and RSL may form a storage capacitor.

The protective layer PSV may cover the source electrode SE, the drain electrode DE, the conductive channel, and the gate insulating layer GI. The protective layer PSV may have a contact hole CH. A portion of the drain electrode DE may be exposed through the contact hole CH. The protective layer PSV may include, for example, silicon nitride or silicon oxide. According to an exemplary embodiment of the present invention, the protective layer PSV may include a single-layered structure; however, exemplary embodiments of the present invention are not limited thereto. An insulating layer, such as the protective layer PSV, may have a multi-layered structure.

The pixel electrode PE may be connected to the drain electrode DE. The pixel electrode PE may be connected to the drain electrode DE through the contact hole CH included in the protective layer PSV.

The pixel electrode PE may have a first domain dividing means PEDD. The domain diving means PEDD may divide the pixel PX into a plurality of domains. The first domain dividing means PEDD may be a cut-away part or projection formed by patterning the pixel electrode PE. The cut-away part may be an aperture or slit formed by removing a portion of the pixel electrode PE. The first domain dividing means PEDD may include a lateral portion. The lateral portion may extend substantially parallel along the first direction D1 or the second direction D2. The lateral portion of the first domain diving means PEDD may divide the length direction of the pixel into two portions, and diagonal portions inclined with respect to the first direction D1 or the second direction D2. The diagonal portions may be substantially axisymmetric to each other with respect to the lateral portion.

The pixel electrode PE may include a transparent conductive material. For example, the pixel electrode PE may include a transparent conductive oxide. The transparent conductive oxide may be indium tin oxide (ITO), indium zinc oxide (IZO), or indium tin zinc oxide (ITZO).

The first alignment layer ALN1 may be disposed over the pixel electrode PE. The first alignment layer ALN1 may align liquid crystal molecules of the liquid crystal layer LC. The first alignment layer ALN1 may include a polymer. The polymer may be polymerized by the monomer represented by Formula 5. The monomer of Formula 5 has, as a terminal group, a reactive group of 1 to 6 carbon atoms, which may cause a polymerization reaction. The polymerization reaction may be caused by the reactive group. The reactive group may be an acrylate group, a methacrylate group, an epoxy group, an oxetane group, a vinyl-ether group, or a styrene group of 1 to 12 carbon atoms. However, exemplary embodiments of the present invention are not limited thereto. For example, another reactive group causing a polymerization reaction may be used.

The second substrate SUB2 may include a second base substrate BS2, a plurality of color filters CF, a black matrix BM, a common electrode CE, and a second alignment layer ALN2.

The color filters CF may be disposed on the second base substrate BS2. The color filters CF may be disposed on the second base substrate BS2 corresponding to the respective pixels PX. The color filters CF may represent a red color, a green color, and a blue color, respectively. However, the exemplary embodiments of the present invention are not limited thereto. For example, the color filters CF may represent various colors such as white, yellow, cyan, or magenta.

The black matrix BM may be disposed between the color filters CF. The black matrix BM may surround each of the color filters CF. The black matrix BM may reduce or block light transmitted through the liquid crystal layer LC between adjacent pixels PX.

According to an exemplary embodiment of the present invention, the color filters CF and the black matrix BM may each be included in the second substrate SUB2. However, a position of the color filters CF and/or a position of the black matrix BM are not limited thereto. According to an exemplary embodiment of the present invention, the color filters CF and the black matrix BM may be included in the first substrate SUB1.

The common electrode CE may be disposed on the color filters CF and the black matrix BM. The common electrode CE may form an electric field together with the pixel electrode PE. Thus, the liquid crystal layer LC may be driven. The common electrode CE may include a transparent conductive material. The common electrode CE may include a conductive metal oxide. The conductive metal oxide may be tin oxide (ITO), indium zinc oxide (IZO), or indium tin zinc oxide (ITZO).

The common electrode CE may have a second domain dividing means CEDD. The second domain dividing means CEDD may divide the pixel PX into a plurality of domains. The second domain dividing means CEDD may be a cut-away part or projection formed by patterning the common electrode CE. The cut-away part may be an aperture formed by removing a portion of the common electrode CE. The second domain dividing means CEDD may include a lateral portion and/or a longitudinal portion. The lateral portion and/or the longitudinal portion may extend substantially parallel along the first direction D1 or the second direction D2. The lateral portion and/or the longitudinal portion may divide the length direction of the pixel into two, and diagonal portions inclined with respect to the first direction D1 or the second direction D2. The diagonal portions may be substantially axisymmetric to each other with respect to the lateral portion.

The lateral portion of the first domain dividing means PEDD and the lateral portion of the second domain dividing means CEDD may be substantially located on the same plane. The diagonal portions of the first domain dividing means PEDD and the diagonal portions of the second domain dividing means CEDD may be arranged adjacent to each other in the same direction. The diagonal portions of the first domain dividing means PEDD and the diagonal portions of the second domain dividing means CEDD may be alternately disposed.

The second alignment layer ALN2 may be disposed over the common electrode CE. The second alignment layer ALN2 may align the liquid crystal molecules of the liquid crystal layer LC.

The liquid crystal layer LC may include a liquid crystal composition. The liquid crystal layer LC may be disposed between the first substrate SUB1 and the second substrate SUB2. The liquid crystal layer LC may include the liquid crystal composition according to an exemplary embodiment of the present invention.

In the liquid crystal display, if a gate signal is applied to the gate line GL, the thin film transistor TR may be turned on. Thus, a data signal applied to the data line DL may be applied to the pixel electrode PE through the thin film transistor TR. If the data signal is applied to the pixel electrode PE as the thin film transistor TR is turned on, an electric field may be formed between the pixel electrode PE and the common electrode CE. The liquid crystal molecules may be driven by the electric field generated by a difference in voltage between the common electrode CE and the pixel electrode PE. Accordingly, an amount of light transmitted through the liquid crystal layer LC may be changed. Thus, an image may be displayed.

Referring to FIGS. 4 and 5, the liquid crystal display according to an exemplary embodiment of the present invention may include the first substrate SUB1, the second substrate SUB2, and the liquid crystal layer LC. The second substrate SUB2 may be disposed opposite the first substrate SUB1. For example, the second substrate SUB2 may be disposed over the first substrate SUB1. The liquid crystal layer LC may be disposed between the first substrate SUB1 and the second substrate SUB2.

Each of the pixels PX may include a thin film transistor TR, a pixel electrode PE, and a storage electrode part. The pixel electrode PE may be connected to the thin film transistor TR.

The pixel electrode PE may have a different shape from the pixel electrode PE previously described with reference to FIGS. 1 to 3. The pixel electrode PE may include a stem part PEa and a plurality of branch parts PEb. The branch parts PEb may extend from the stem part PEa. The branch parts PEb may radially protrude from the stem part PEa. The branch parts PEb may be disposed adjacent to each other. A slit may be disposed between adjacent branch parts PEb. A portion of the stem part PEa or a portion of the branch parts PEb may be connected to the drain electrode DE. The portion of the stem part PEa or the portion of the branch parts PEb may be connected to the drain electrode DE through the contact hole CH.

The stem part PEa may have various shapes. For example, the stem part PEa may have a cross shape. When the stem part PEa has a cross shape, the pixel PX may be divided into a plurality of domains by the stem part PEa. The branch parts PEb may extend in different directions. The branch parts PEb may extend in different directions corresponding to the respective domains. According to an exemplary embodiment of the present invention, the pixel PX may be divided into four domains. The branch parts PEb may be spaced apart from each other. The branch parts PEb may be spaced apart from each other such that each of the branch parts PEb is not in direct contact with an adjacent branch part PEb. The branch parts PEb may extend in directions substantially parallel to each other within a region divided by the stem part PEa. Slits may be disposed between adjacent branch parts PEb. The slits may be spaced apart from each other at a distance of a micrometer unit. The slits may correspond to a domain dividing means. Accordingly, the domain dividing means may allow the liquid crystal molecules of the liquid crystal layer LC to be aligned at an angle on a plane substantially parallel to the first base substrate SUB1 and the second base substrate SUB2.

The second substrate SUB2 may include the second base substrate SB2, the color filters CF, the black matrix BM, the common electrode CE, and the second alignment layer ALN2. The second base substrate SB2, the color filters CF, the black matrix BM, the common electrode DE, and the second alignment layer ALN2 may be disposed on the second base substrate BS2. The common electrode CE might not have a separate domain dividing means. Therefore, the common electrode CE may be a whole plate.

According to an exemplary embodiment of the present invention, two gate lines and one data line may be connected to one pixel. According to an exemplary embodiment of the present invention, one gate line and two data lines may be connected to one pixel. Alternatively, one pixel may have two sub-pixels. Two voltages different from each other may be applied to the two sub-pixels. A relatively high voltage may be applied to one sub-pixel. A relatively low voltage may be applied to the other sub-pixel. Each of the components in the pixel, for example, the gate electrode GE, the source electrode SE, the drain electrode DE, may be disposed in a different structure than described herein.

1. Properties of Liquid Crystal Compounds

Property values of liquid crystal compounds of Examples 1 to 3 are shown in Table 1.

TABLE 1

| Liquid Crystal Compound | Tni (° C.) | $\Delta n$ | $\Delta\varepsilon$ | $\gamma 1$ (mPa · s) |
| --- | --- | --- | --- | --- |
| Example 1 | 109.4 | 0.2454 | −1.96 | 393 |
| Example 2 | 32 | 0.049 | 0.03 | 26 |
| Example 3 | 127.9 | 0.2531 | 0.5 | 199 |

The liquid crystal compounds of Examples 1 to 3 are liquid crystal compounds represented by the following Formulae 6 to 8, respectively.

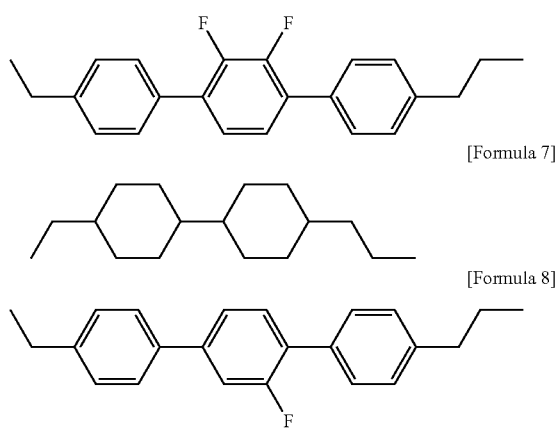

[Formula 6]
[Formula 7]
[Formula 8]

Property values of liquid crystal compounds of Examples 1-1, 2-1, and 3-1 are shown in Table 2.

TABLE 2

| Liquid Crystal Compound | Tni (° C.) | Δn | Δε | γ1 (mPa · s) |
|---|---|---|---|---|
| Example 1-1 | 58.4 | 0.214 | −1.76 | 119 |
| Example 2-1 | 32.9 | 0.224 | 0.3 | 54 |
| Example 3-1 | 57 | 0.231 | 0.58 | 54 |

The liquid crystal compounds used in Examples 1-1, 2-1, and 3-1 are liquid crystal compounds represented by the following Formulae 1-1-1 to 1-1-3, respectively.

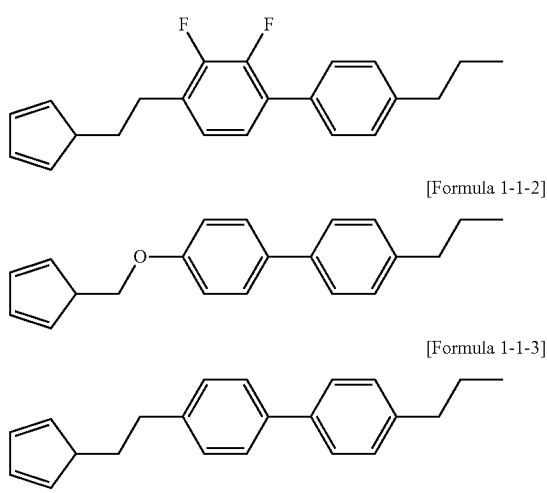

[Formula 1-1-1]
[Formula 1-1-2]
[Formula 1-1-3]

Liquid crystal compounds of which two or more properties among nematic phase-isotropic phase transition temperature (Tni), refractive anisotropy (Δn), dielectric anisotropy (Δε), and rotational viscosity (γ1) are substantially equal are represented as examples.

The liquid crystal compound of Example 1 and the liquid crystal compound of Example 1-1 have substantially equal values with respect to the refractive anisotropy and the dielectric anisotropy. However, while the rotational viscosity of Example 1 is 393 mPa·s, the rotational viscosity of Example 1-1 is 119 mPa·s. Therefore, Example 1-1 has a relatively low rotational viscosity as compared with Example 1. For reference, the nematic phase-isotropic phase transition temperatures of Example 1 and Example 1-1 are 109.4° C. and 58.4° C., respectively, which are different from each other. However, this relatively small difference does not make a difference in the total liquid crystal composition due to a mixture of other liquid crystal compounds. Example 1 and Example 1-1 have substantially equal values with respect to the nematic phase-isotropic phase transition temperature.

The liquid crystal compound of Example 2 and the liquid crystal compound of Example 2-1 have substantially equal values with respect to the nematic phase-isotropic phase transition temperature and the dielectric anisotropy. However, while the refractive anisotropy of Example 2 is 0.049, the refractive anisotropy of Example 2-1 is 0.224. Therefore, Example 2-1 has a relatively high refractive anisotropy as compared with Example 2. For reference, the rotational viscosities of Example 2 and Example 2-1 are 26 and 54, respectively, which are different from each other. However, this relatively small difference does not make a difference in the total liquid crystal composition due to a mixture of other liquid crystal compounds. Example 2 and Example 2-1 have substantially equal values with respect to the rotational viscosity.

The liquid crystal compound of Example 3 and the liquid crystal compound of Example 3-1 have substantially equal values with respect to the refractive anisotropy and the dielectric anisotropy. However, while the rotational viscosity of Example 3 is 199 mPa·s, the rotational viscosity of Example 3-1 is 54 mPa·s. Therefore, Example 3-1 has a relatively low rotational viscosity as compared with Example 3. For reference, the nematic phase-isotropic phase transition temperatures of Example 1 and Example 1-1 are 127.9° C. and 57° C., respectively, which are different from each other. However, this relatively small difference does not make a difference in the total liquid crystal composition due to a mixture of other liquid crystal compounds. Example 3 and Example 3-1 have substantially equal values with respect to the nematic phase-isotropic phase transition temperature.

2. Properties of Liquid Crystal Compositions

Property values of a liquid crystal compound of Example 4 are as shown in Table 3.

TABLE 3

| Liquid Crystal Compounds | Content (% by weight) |
|---|---|
|  | 25 |

TABLE 3-continued

| Liquid Crystal Compounds | Content (% by weight) |
|---|---|
| [structure: ethyl-cyclohexyl-cyclohexyl-propyl] | 6 |
| [structure: vinyl-cyclohexyl-cyclohexyl-phenyl-methyl] | 3 |
| [structure: propyl-cyclohexyl-difluorophenyl-O-ethyl] | 22 |
| [structure: propyl-cyclohexyl-cyclohexyl-difluorophenyl-O-ethyl] | 20 |
| [structure: ethyl-phenyl-fluorophenyl-phenyl-propyl] | 7 |
| [structure: ethyl-phenyl-difluorophenyl-phenyl-propyl] | 17 |
| Tni (° C.) | 72 |
| Δn | 0.115 |
| Δε | −2.7 |
| γ1 (mPa · s) | 138 |

Property values of a liquid crystal compound of Example 4-1 are as shown in Table 4.

TABLE 4

| Liquid Crystal Compounds | Content (% by weight) |
|---|---|
| [structure: vinyl-cyclohexyl-cyclohexyl-propyl] | 21 |
| [structure: ethyl-cyclohexyl-cyclohexyl-propyl] | 3 |
| [structure: cyclopentadienyl-CH2-O-phenyl-phenyl-propyl] | 11 |
| [structure: propyl-cyclohexyl-difluorophenyl-O-ethyl] | 22 |

TABLE 4-continued
| Liquid Crystal Compounds | Content (% by weight) |
|---|---|
| 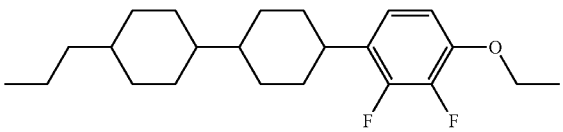 | 22 |
| 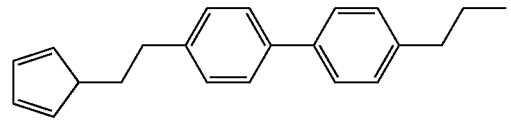 | 6 |
| 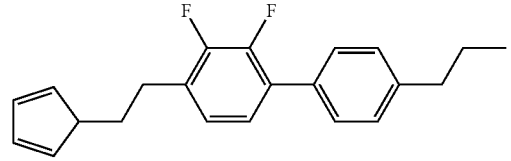 [SMILES: CCCc1ccc(-c2ccc(CCC3C=CC=C3)c(F)c2F)cc1] | 15 |
| Tni (° C.) | 71 |
| Δn | 0.115 |
| Δε | −2.7 |
| γ1 (mPa · s) | 129 |
Property values of a liquid crystal compound of Example 5-1 are as shown in Table 5.
TABLE 5
| Liquid Crystal Compounds | Content (% by weight) |
|---|---|
| 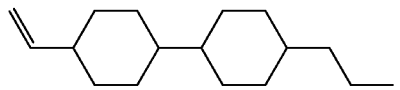 [SMILES: C=CC1CCC(C2CCC(CCC)CC2)CC1] | 25 |
| 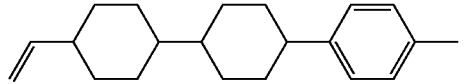 [SMILES: C=CC1CCC(C2CCC(c3ccc(C)cc3)CC2)CC1] | 6.5 |
| 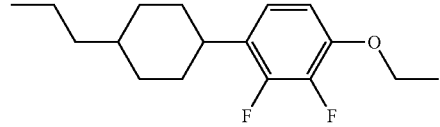 [SMILES: CCCC1CCC(c2ccc(OCC)c(F)c2F)CC1] | 22 |
| 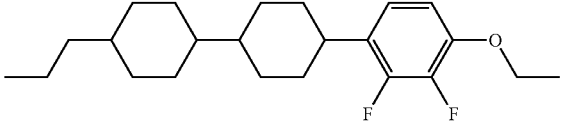 [SMILES: CCCC1CCC(C2CCC(c3ccc(OCC)c(F)c3F)CC2)CC1] | 21 |
| 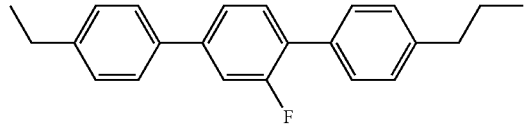 [SMILES: CCCc1ccc(-c2ccc(-c3ccc(CC)cc3)cc2F)cc1] | 9.5 |

TABLE 5-continued
| Liquid Crystal Compounds | Content (% by weight) |
|---|---|
| 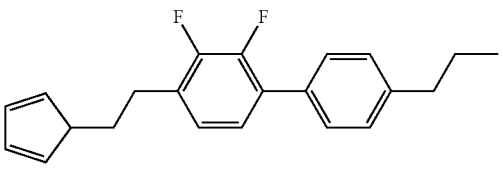 [SMILES: CCCc1ccc(-c2ccc(CCC3C=CC=C3)c(F)c2F)cc1] | 16 |
| Tni (° C.) | 72 |
| Δn | 0.115 |
| Δε | −2.7 |
| γ1 (mPa · s) | 130 |
Property values of a liquid crystal compound of Example 6-1 are as shown in Table 6.
TABLE 6
| Liquid Crystal Compounds | Content (% by weight) |
|---|---|
| 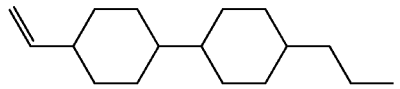 [SMILES: C=CC1CCC(C2CCC(CCC)CC2)CC1] | 25 |
| 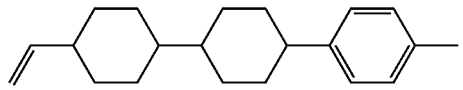 | 7.5 |
| 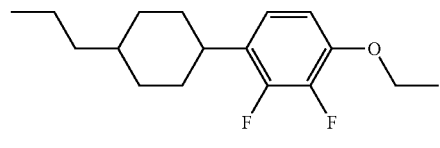 | 22 |
| 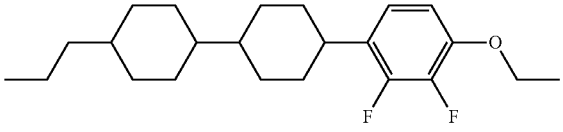 [SMILES: CCCC1CCC(C2CCC(c3ccc(OCC)c(F)c3F)CC2)CC1] | 22 |
| 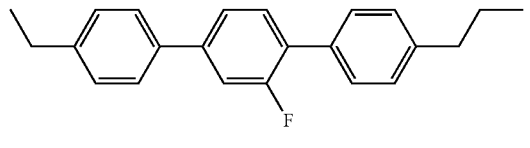 | 3 |
| 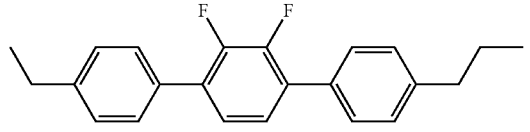 [SMILES: CCCc1ccc(-c2ccc(-c3ccc(CC)cc3)c(F)c2F)cc1] | 9.5 |
| 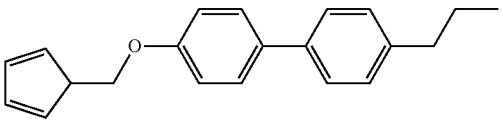 [SMILES: CCCc1ccc(-c2ccc(OCC3C=CC=C3)cc2)cc1] | 11 |
| Tni (° C.) | 72 |
| Δn | 0.116 |
| Δε | −2.6 |
| γ1 (mPa · s) | 133 |

Property values of a liquid crystal compound of Example 7-1 are as shown in Table 7.
TABLE 7
| Liquid Crystal Compounds | Content (% by weight) |
| --- | --- |
| 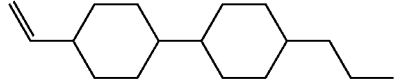 [SMILES: C=CC1CCC(C2CCC(CCC)CC2)CC1] | 25 |
| 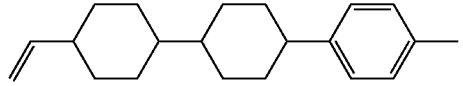 | 7 |
| 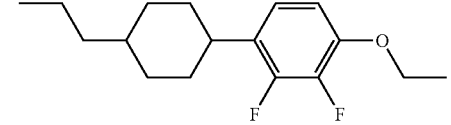 [SMILES: CCCC1CCC(c2ccc(OCC)c(F)c2F)CC1] | 22 |
| 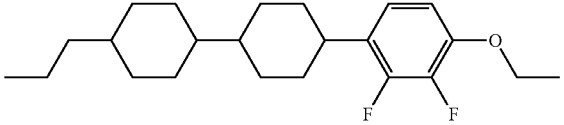 | 22 |
| 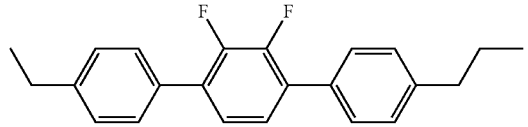 | 11.5 |
| 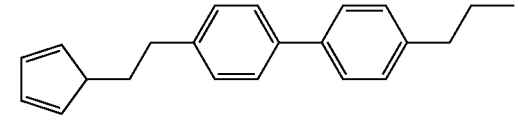 [SMILES: CCCc1ccc(-c2ccc(CCC3C=CC=C3)cc2)cc1] | 12.5 |
| Tni (° C.) | 73 |
| Δn | 0.116 |
| Δε | −2.7 |
| γ1 (mPa · s) | 132 |
Property values of a liquid crystal compound of Example 8-1 are as shown in Table 8.
TABLE 8
| Liquid Crystal Compounds | Content (% by weight) |
| --- | --- |
| 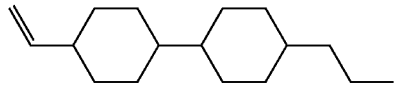 | 25 |
| 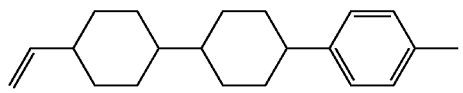 [SMILES: C=CC1CCC(C2CCC(c3ccc(C)cc3)CC2)CC1] | 6 |
| 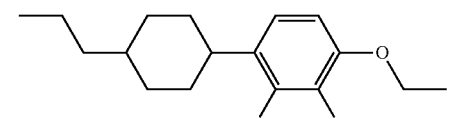 | 22 |
| 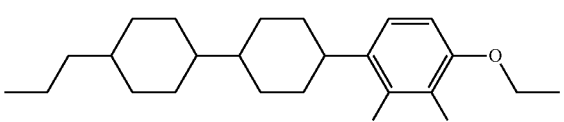 | 22 |

TABLE 8-continued
| Liquid Crystal Compounds | Content (% by weight) |
|---|---|
| 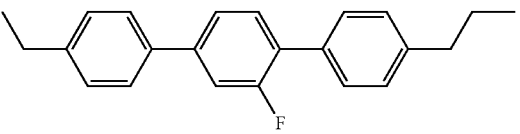 [SMILES: CCCc1ccc(-c2ccc(-c3ccc(CC)cc3)cc2F)cc1] | 9.5 |
| 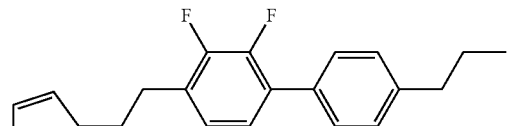 | 11.5 |
| 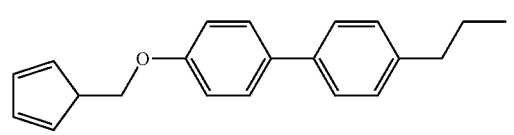 | 4 |
| Tni (° C.) | 72 |
| Δn | 0.115 |
| Δε | −2.7 |
| γ1 (mPa·s) | 129 |
Property values of a liquid crystal compound of Example 9-1 are as shown in Table 9.
TABLE 9
| Liquid Crystal Compounds | Content (% by weight) |
|---|---|
| 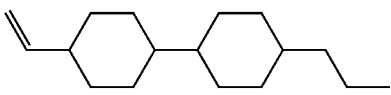 | 25 |
| 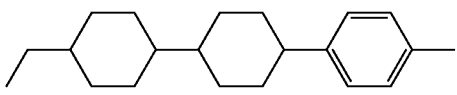 [SMILES: CCC1CCC(C2CCC(c3ccc(C)cc3)CC2)CC1] | 6.5 |
| 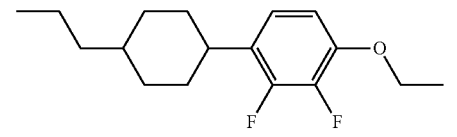 [SMILES: CCCC1CCC(c2ccc(OCC)c(F)c2F)CC1] | 22 |
| 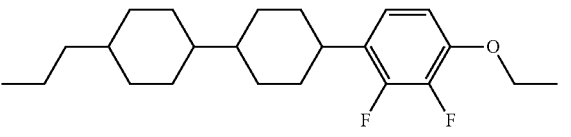 [SMILES: CCCC1CCC(C2CCC(c3ccc(OCC)c(F)c3F)CC2)CC1] | 22 |
| 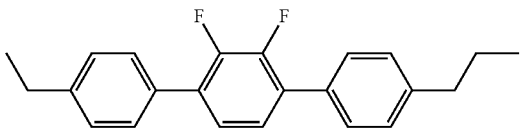 [SMILES: CCCc1ccc(-c2ccc(-c3ccc(CC)cc3)c(F)c2F)cc1] | 11 |
| 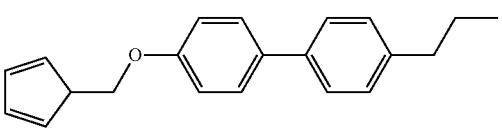 [SMILES: CCCc1ccc(-c2ccc(OCC3C=CC=C3)cc2)cc1] | 2.5 |

TABLE 9-continued

| Liquid Crystal Compounds | Content (% by weight) |
|---|---|
| 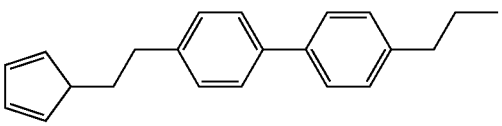 | 11 |
| Tni (° C.) | 72 |
| Δn | 0.115 |
| Δε | −2.7 |
| γ1 (mPa·s) | 129 |

Property values of a liquid crystal compound of Example 10-1 are as shown in Table 10.

TABLE 10

| Liquid Crystal Compounds | Content (% by weight) |
|---|---|
| 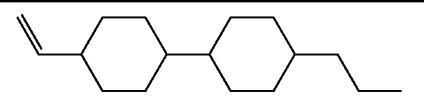 | 21 |
| 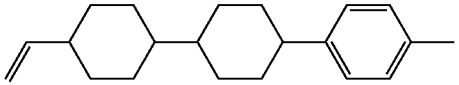 [SMILES: C=CC1CCC(C2CCC(c3ccc(C)cc3)CC2)CC1] | 11 |
| 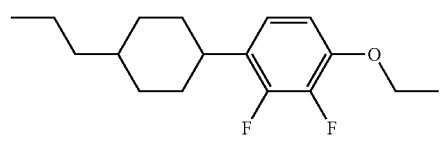 | 22 |
| 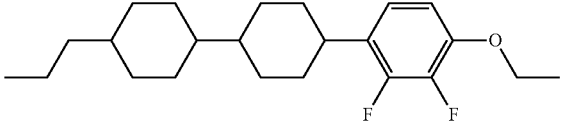 [SMILES: CCCC1CCC(C2CCC(c3ccc(OCC)c(F)c3F)CC2)CC1] | 22 |
| 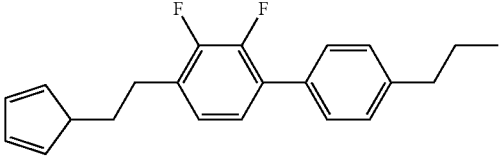 | 15 |
| 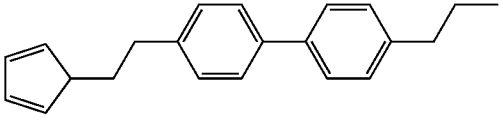 | 9 |
| Tni (° C.) | 72 |
| Δn | 0.115 |
| Δε | −2.7 |
| γ1 (mPa·s) | 129 |

Example 4 is an existing liquid crystal composition omitting a cyclopentadienyl-based liquid crystal compound. Examples 4-1 to 10-1 correspond to liquid crystal compositions including 1 to 3 types of cyclopentadienyl-based liquid crystal compounds. The liquid crystal compositions of Examples 4-1 to 10-1, which include 1 to 3 types of cyclopentadienyl-based liquid crystal compounds, all exhibit substantially equal nematic-phase-isotropic phase transition temperatures, refractive anisotropies, and dielectric anisotropies, as compared with Example 4 omitting a cyclopentadienyl-based liquid crystal compound.

However, while the rotational viscosity of the liquid crystal composition of Example 4 is 138 mPa·s, the rotational viscosities of the liquid crystal compositions of Examples 4-1 to 10-1 is 129 mPa·s to 133 mPa·s. Therefore, the Examples 4-1 to 10-1 exhibit relatively small values, as compared with Example 4.

According to an exemplary embodiment of the present invention, a liquid crystal composition having a relatively low viscosity and a liquid crystal display including the same may be provided.

Exemplary embodiments of the present invention have been disclosed herein. Although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular exemplary embodiment of the present invention may be used singly or in combination with features, characteristics, and/or elements described in connection with other exemplary embodiments of the present invention unless otherwise specifically indicated. Accordingly, it will be understood by those of skill in the art that various changes in form and details may be made without departing from the spirit and scope of the present invention.

What is claimed is:

1. A display, comprising:
a first substrate;
a second substrate disposed opposite to the first substrate; and
a liquid crystal layer disposed between the first substrate and the second substrate, the liquid crystal layer including a liquid crystal composition,
wherein the liquid crystal composition includes at least one of liquid crystal compounds represented by the following Formulae 1 to 3:

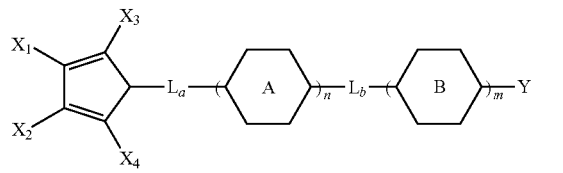

[Formula 1]

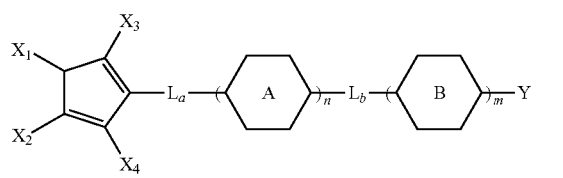

[Formula 2]

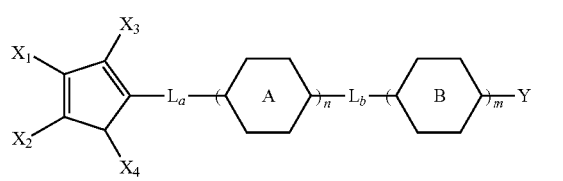

[Formula 3]

wherein A and B are each independently 1,4-cyclohexylene or 1,4-phenylene, and each —H of the 1,4-cyclohexylene and 1,4-phenylene is independently unsubstituted or substituted by —F, —Cl, —OCF$_3$, —CF$_3$, —CHF$_2$, —CH$_2$F, an alkyl group or an alkoxy group of 1 or 2 carbon atoms,
Y is —H or an alkyl group of 1 to 10 carbon atoms, in which each —CH$_2$— group of the alkyl group of 1 to 10 carbon atoms is independently unsubstituted or substituted by —C≡C—, —CH=CH—, CF$_2$O—, —O—, —CO—O—, —O—CO—, or —O—CO—O— such that O atoms are not linked directly to each other, and each —H of the alkyl group of 1 to 10 carbon atoms is unsubstituted or substituted by a halogen atom,
X$_1$ to X$_4$ are each independently —H, —F, —Cl, or an alkyl group of 1 or 2 carbon atoms,
n and m are each independently an integer selected from 0 to 2, and
L$_a$ and L$_b$ are each independently a single bond, —C≡C—, —COO—, —OCO—, —CF$_2$O—, —OCF$_2$—, —CH$_2$O—, —CO—, —O—, —(CH$_2$)$_2$—, or —CH=CH—.

2. The display of claim 1, wherein the liquid crystal compounds of Formulae 1 to 3 are in an amount of more than about 0% by weight to about 50% by weight with respect to the liquid crystal composition.

3. The display of claim 1, wherein the liquid crystal compound of Formula 1 includes at least one of liquid crystal compounds represented by the following Formula 1-1:

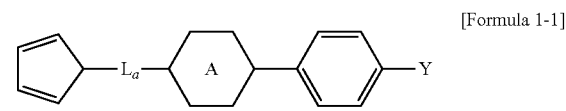

[Formula 1-1]

wherein A, L$_a$, and Y are the same as defined in Formula 1 of claim 1.

4. The display of claim 3, wherein the liquid crystal compound of Formula 1-1 includes at least one of liquid crystal compounds represented by the following Formulae 1-1-1 to 1-1-3:

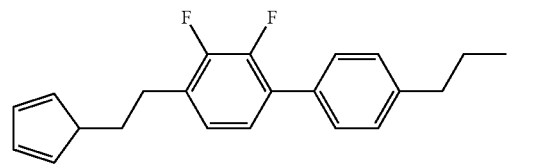

[Formula 1-1-1]

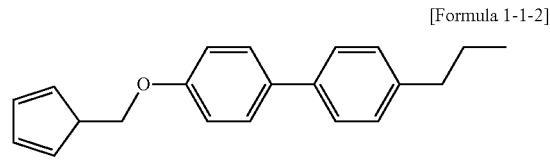

[Formula 1-1-2]

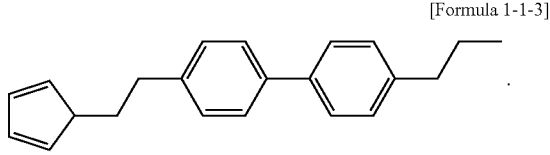

[Formula 1-1-3]

5. The display of claim 1, wherein the liquid crystal composition includes at least one of liquid crystal compounds represented by the following Formula 4:

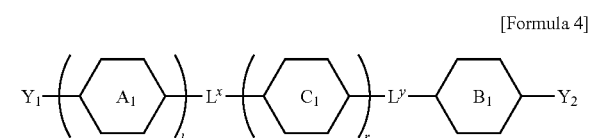

[Formula 4]

wherein $Y_1$ and $Y_2$ are each independently —F, —Cl, or an alkyl group of 1 to 15 carbon atoms, in which one or more —CH$_2$— groups are each independently unsubstituted or substituted by —C≡C—, —CH═CH—, CF$_2$O—, —O—, —CO—O—, —O—CO—, or —O—CO—O— such that O atoms are not linked directly to each other, and —H is unsubstituted or substituted by a halogen atom, $A_1$, $B_1$, and $C_1$ are each independently 1,4-cyclohexylene or 1,4-phenylene, and —H of $A_1$, $B_1$, and $C_1$ are each independently unsubstituted or substituted by —F, —Cl, —OCF$_3$, —CF$_3$, —CHF$_2$, —CH$_2$F, an alkyl group or an alkoxy group of 1 or 2 carbon atoms, l and r are each independently an integer selected from 0 to 2, and $L^X$ and $L^Y$ are each independently a single bond, —C≡C—, —COO—, —OCO—, —CF$_2$O—, —OCF$_2$—, —CH$_2$O—, —CO—, —O—, —(CH$_2$)$_2$—, or —CH═CH—.

6. The display of claim 5, wherein the liquid crystal compound of Formula 4 includes at least one of liquid crystal compounds represented by the following Formulae 4-1 to 4-8:

[Formula 4-1]

[Formula 4-2]

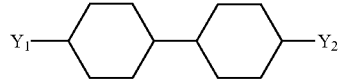
[Formula 4-3]

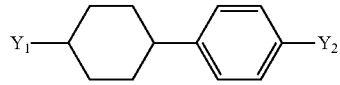
[Formula 4-4]

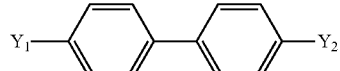
[Formula 4-5]

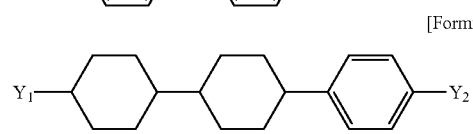
[Formula 4-6]

[Formula 4-7]

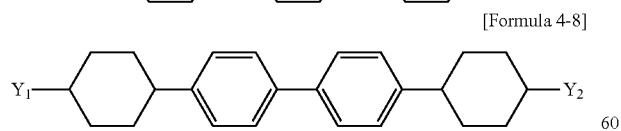
[Formula 4-8]

wherein $Y_1$ and $Y_2$ are the same as defined in Formula 4.

7. The display of claim 5, wherein the liquid crystal compound of Formula 4 includes at least one of liquid crystal compounds represented by the following Formulae 4-9 to 4-19:

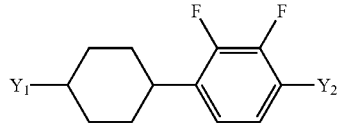
[Formula 4-9]

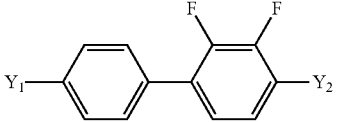
[Formula 4-10]

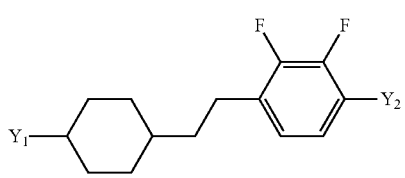
[Formula 4-11]

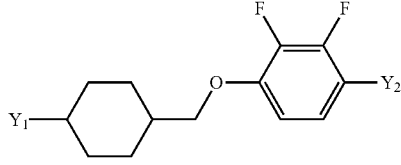
[Formula 4-12]

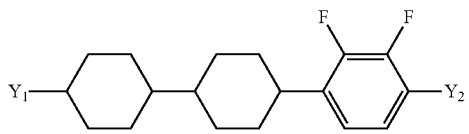
[Formula 4-13]

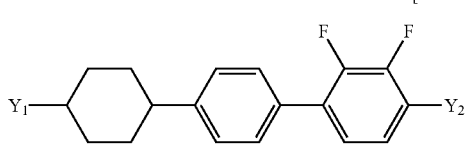
[Formula 4-14]

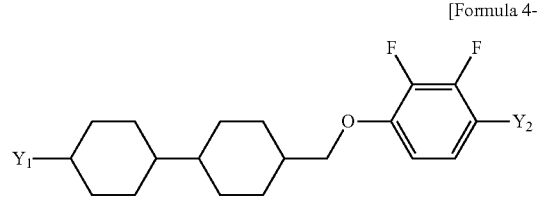
[Formula 4-15]

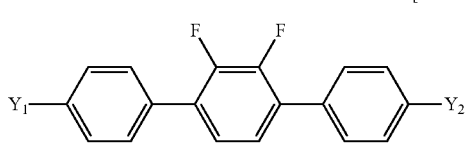
[Formula 4-16]

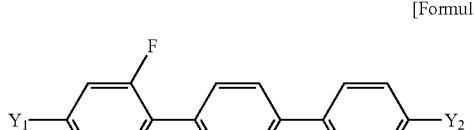
[Formula 4-17]

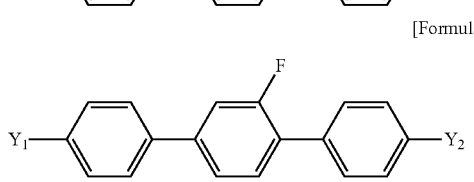
[Formula 4-18]

[Formula 4-19]

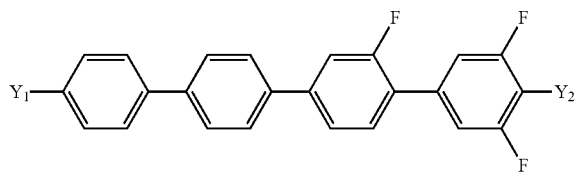

wherein Y₁ and Y₂ are the same as defined in Formula 4.

8. The display of claim 1, wherein the liquid crystal composition has a negative dielectric anisotropy.

9. The display of claim 1, further comprising an alignment layer disposed between at least one of the first substrate and the liquid crystal layer or the second substrate and the liquid crystal layer, wherein the alignment layer includes a polymer polymerized by a monomer represented by the following Formula 5:

[Formula 5]

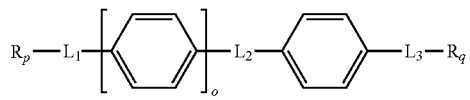

wherein $R_p$ and $R_q$ are each independently an acrylate group, a methacrylate group, an epoxy group, an oxetane group, a vinyl-ether group, or a styrene group of 1 to 12 carbon atoms, $L_1$ to $L_3$ are each independently a single bond, an ether group, a carbonyl group, or a carboxyl group of 1 or 2 carbon atoms, and o is an integer selected from 1 or 2.

10. The display of claim 1, wherein the liquid crystal layer is driven in a vertical alignment mode.

11. A composition including at least one of liquid crystal compounds represented by the following Formulae 1 to 3:

[Formula 1]

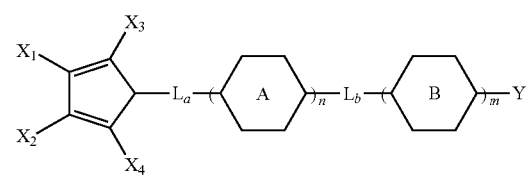

[Formula 2]

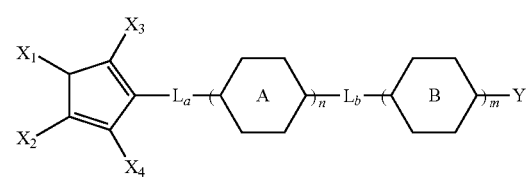

[Formula 3]

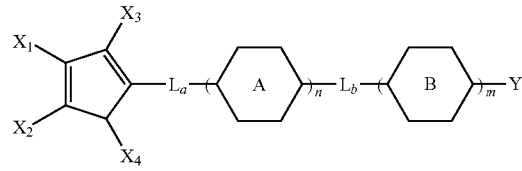

wherein A and B are each independently 1,4-cyclohexylene or 1,4-phenylene, and each —H of the 1,4-cyclohexylene and 1,4-phenylene is independently unsubstituted or substituted by —F, —Cl, —OCF₃, —CF₃, —CHF₂, —CH₂F, an alkyl group or an alkoxy group of 1 or 2 carbon atoms, Y is —H or an alkyl group of 1 to 10 carbon atoms, in which each —CH₂— group of the alkyl group of 1 to 10 carbon atoms is independently unsubstituted or substituted by —C≡C—, —CH=CH—, CF₂O—, —O—, —CO—O—, —O—CO—, or —O—CO—O— such that O atoms are not linked directly to each other, and each —H of the alkyl group of 1 to 10 carbon atoms is unsubstituted or substituted by a halogen atom, X₁ to X₄ are each independently —H, —F, —Cl, or alkyl of 1 or 2 carbon atoms, n and m are each independently an integer selected from 0 to 2, and $L_a$ and $L_b$ are each independently a single bond, —C≡C—, —COO—, —OCO—, —CF₂O—, —OCF₂—, —CH₂O—, —CO—, —O—, —(CH₂)₂—, or —CH=CH—.

12. The composition of claim 11, wherein the liquid crystal compounds of Formulae 1 to 3 are in an amount of more than about 0% by weight to about 50% by weight with respect to the liquid crystal composition.

13. The composition of claim 11, wherein the liquid crystal compound of Formula 1 includes at least one of liquid crystal compounds represented by the following Formula 1-1:

[Formula 1-1]

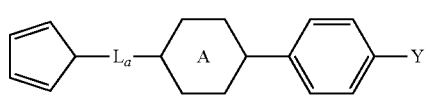

wherein A, $L_a$, and Y are the same as defined in Formula 1.

14. The composition of claim 13, wherein the liquid crystal compound of Formula 1-1 includes at least one of liquid crystal compounds represented by the following Formulae 1-1-1 to 1-1-3:

[Formula 1-1-1]

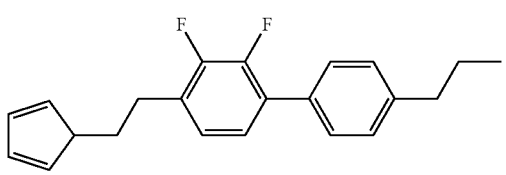 [SMILES: CCCc1ccc(-c2ccc(CCC3C=CC=C3)c(F)c2F)cc1]

-continued

[Formula 1-1-2]

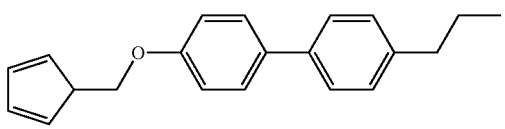

[Formula 1-1-3]

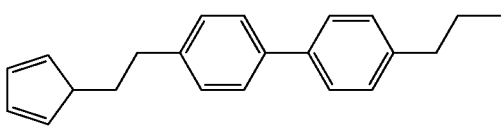 [SMILES: CCCc1ccc(-c2ccc(CCC3C=CC=C3)cc2)cc1]

15. The composition of claim 11, wherein the composition further includes at least one of liquid crystal compounds represented by the following Formula 4:

[Formula 4]

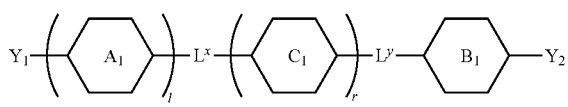

wherein $Y_1$ and $Y_2$ are each independently —F, —Cl, or an alkyl group of 1 to 15 carbon atoms, in which one or more —$CH_2$— groups are each independently unsubstituted or substituted by —C≡C—, —CH=CH—, $CF_2O$—, —O—, —CO—O—, —O—CO—, or —O—CO—O— such that O atoms are not linked directly to each other, and —H is unsubstituted or substituted by a halogen atom, $A_1$, $B_1$, and $C_1$ are each independently 1,4-cyclohexylene or 1,4-phenylene, and —H of $A_1$, $B_1$, and $C_1$ are each independently unsubstituted or substituted by —F, —Cl, —$OCF_3$, —$CF_3$, —$CHF_2$, —$CH_2F$, an alkyl group or an alkoxy group of 1 or 2 carbon atoms, l and r are each independently an integer selected from 0 to 2, and $L^X$ and $L^Y$ are each independently a single bond, —C≡C—, —COO—, —OCO—, —$CF_2O$—, —$OCF_2$—, —$CH_2O$—, —CO—, —O—, —$(CH_2)_2$—, or —CH=CH—.

16. The composition of claim 15, wherein the liquid crystal compound of Formula 4 includes at least one of liquid crystal compounds represented by the following Formulae 4-1 to 4-8:

[Formula 4-1]

[Formula 4-2]

[Formula 4-3]

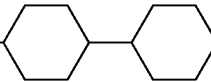

[Formula 4-4]

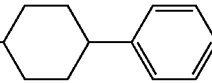

[Formula 4-5]

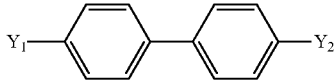

[Formula 4-6]

[Formula 4-7]

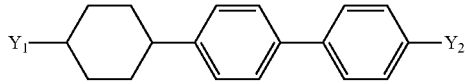

[Formula 4-8]

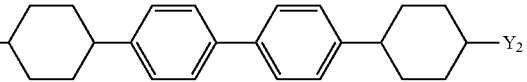

wherein $Y_L$ and $Y_2$ are the same as defined in Formula 4 of claim 15.

17. The composition of claim 15, wherein the liquid crystal compound of Formula 4 includes at least one of liquid crystal compounds represented by the following Formulae 4-9 to 4-19:

[Formula 4-9]

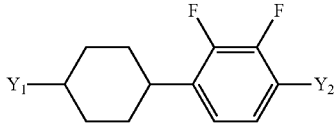

[Formula 4-10]

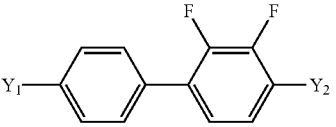

[Formula 4-11]

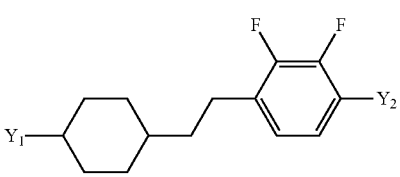

[Formula 4-12]

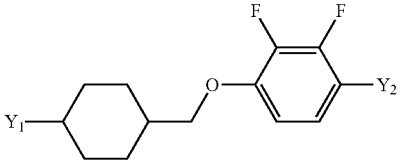

[Formula 4-13]

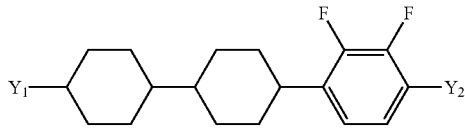

[Formula 4-14]

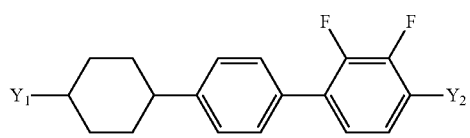

[Formula 4-15]

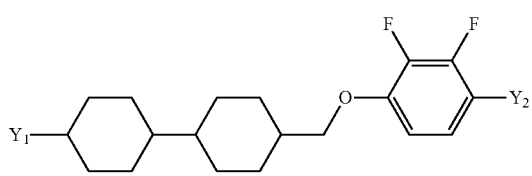

[Formula 4-16]

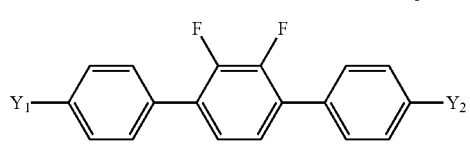

[Formula 4-17]

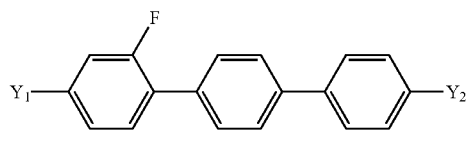

[Formula 4-18]

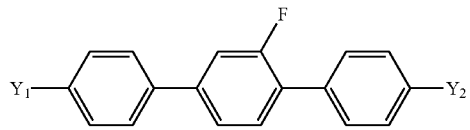

[Formula 4-19]

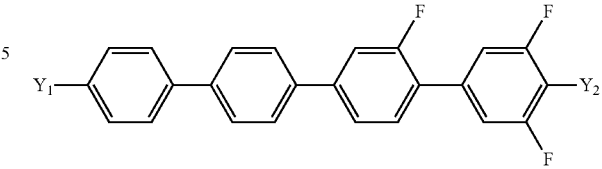

wherein $Y_1$ and $Y_2$ are the same as defined in Formula 4 of claim 15.

18. The composition of claim 11, wherein the composition has a negative dielectric anisotropy.

19. The composition of claim 11, further comprising a monomer represented by the following Formula 5:

[Formula 5]

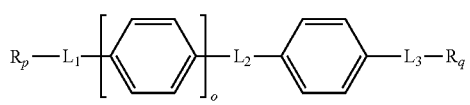

wherein $R_p$ and $R_q$ are each independently an acrylate group, a methacrylate group, an epoxy group, an oxetane group, a vinyl-ether group, or a styrene group of 1 to 12 carbon atoms, $L_1$ to $L_3$ are each independently a single bond, or an ether group, a carbonyl group, or a carboxyl group of 1 or 2 carbon atoms, and o is an integer selected from 1 or 2.

20. The composition of claim 11, wherein the composition is used in a vertical alignment mode liquid crystal display.

21. The composition of claim 11, wherein $X_1$ to $X_4$ are each independently —H, —Cl, or alkyl of 1 or 2 carbon atoms.

\* \* \* \* \*